(12) United States Patent
Braswell et al.

(10) Patent No.: US 12,489,559 B2
(45) Date of Patent: Dec. 2, 2025

(54) FORWARD ERROR CORRECTION WITH FLEXIBLE MATRIX FOR DYNAMIC INPUT DATA RATE

(71) Applicant: Kratos Integral Holdings LLC, San Diego, CA (US)

(72) Inventors: Shane Braswell, Paducah, KY (US); Kevin O'Connor, Aurora, CO (US)

(73) Assignee: Kratos integral Holdings LLC, San Diego, CA (US)

( * ) Notice: Subject to any disclaimer, the term of this patent is extended or adjusted under 35 U.S.C. 154(b) by 59 days.

(21) Appl. No.: 18/642,287

(22) Filed: Apr. 22, 2024

(65) Prior Publication Data
US 2025/0330269 A1    Oct. 23, 2025

(51) Int. Cl.
*H04L 1/00* (2006.01)
*H03M 13/00* (2006.01)
*H03M 13/03* (2006.01)
*H03M 13/17* (2006.01)
*H03M 13/47* (2006.01)

(52) U.S. Cl.
CPC .......... *H04L 1/0063* (2013.01); *H03M 13/03* (2013.01); *H03M 13/17* (2013.01); *H03M 13/47* (2013.01); *H03M 13/616* (2013.01)

(58) Field of Classification Search
CPC ... H04L 1/0063; H03M 13/616; H03M 13/17; H03M 13/03; H03M 13/47
USPC ......................................... 714/800, 752, 821
See application file for complete search history.

(56) References Cited

U.S. PATENT DOCUMENTS

| 4,488,302 A | * | 12/1984 | Ahamed | ............... | H03M 13/17 714/701 |
| 5,491,701 A | * | 2/1996 | Zook | ................... | G06F 11/1068 714/E11.038 |
| 6,606,718 B1 | * | 8/2003 | Bessios | ............... | H03M 13/276 714/701 |

(Continued)

FOREIGN PATENT DOCUMENTS

EP    1758254 A1    2/2007

OTHER PUBLICATIONS

Zhao et al., A Novel Approach to Improving Burst Errors Correction Capability of Hamming Code, Jul. 1, 2007, IEEE, pp. 1193-1196 . (Year: 2007).*

(Continued)

*Primary Examiner* — John J Tabone, Jr.
(74) *Attorney, Agent, or Firm* — Kilpatrick Townsend & Stockton LLP

(57) ABSTRACT

Described herein are systems, methods, and other techniques for performing forward error correction in a communication system. A set of data blocks to be transmitted over a wireless channel are received. Rows of a flexible matrix are formed using the set of data blocks based on arrival times of the set of data blocks, each of the rows corresponding to a different time window. A set of random parity blocks are computed by performing row-wise parity operations on the flexible matrix. A set of burst parity blocks are computed by performing column-wise parity operations on the flexible matrix in accordance with a burst parity computation scheme. The set of data blocks, the set of random parity blocks, and the set of burst parity blocks are transmitted over the wireless channel to a receiver.

20 Claims, 18 Drawing Sheets

(56) References Cited

U.S. PATENT DOCUMENTS

| | | | |
|---|---|---|---|
| 7,035,292 B1* | 4/2006 | Giorgetta | H04J 3/1611 370/510 |
| 2002/0038443 A1* | 3/2002 | Iwata | G11B 20/1803 714/766 |
| 2002/0110071 A1* | 8/2002 | Oki | G11B 20/1866 360/40 |
| 2002/0194568 A1* | 12/2002 | Kobayashi | H03M 13/11 714/763 |
| 2005/0204270 A1* | 9/2005 | Kojima | H03M 13/2909 714/800 |
| 2005/0232103 A1* | 10/2005 | Yoshida | G11B 27/36 |
| 2006/0195756 A1* | 8/2006 | Yoshii | H03M 13/6306 714/755 |
| 2007/0157060 A1* | 7/2007 | Ganga | H04L 1/0058 714/752 |
| 2007/0157065 A1* | 7/2007 | Pons | H03M 13/31 714/800 |
| 2008/0034269 A1* | 2/2008 | Hwang | H03M 13/6356 714/763 |
| 2008/0065971 A1* | 3/2008 | Betts | H03M 13/2707 714/800 |
| 2009/0222709 A1 | 9/2009 | Lin et al. | |
| 2013/0311857 A1* | 11/2013 | Murakami | H03M 13/256 714/786 |
| 2014/0136921 A1* | 5/2014 | Murakami | G06F 11/10 714/758 |
| 2024/0015727 A1* | 1/2024 | Thubert | H04W 72/121 |
| 2024/0015768 A1* | 1/2024 | Thubert | H04W 72/27 |

OTHER PUBLICATIONS

Li et al., "Packet Loss Recovery Algorithm Based on Row-column Coding and RS Coding", Institute of Electrical and Electronics Engineers, 8th International Conference on Communications and Networking in China, 2013, pp. 877-881.

International Application No. PCT/US2025/021775, International Search Report and Written Opinion, Mailed on Jun. 17, 2025, 16 pages.

\* cited by examiner

FIG. 2F

Blocks received at channel encoder

| Block 514-1 | Block 514-2 | Block 514-3 | Block 514-4 | ... | Block 514-50 | ... | Block 514-100 |

FIG. 5A

Blocks transmitted by channel encoder

| Block 514-1 | Block 514-2 | ... | Block 514-9 | Block 514-10 | Parity 516-1 | Block 514-11 | Block 514-12 | ... | Block 514-49 | Block 514-50 | Parity 516-2 | ... |
|---|---|---|---|---|---|---|---|---|---|---|---|---|
| Identifier: 1 Group: 1 Position: 1 | Identifier: 2 Group: 1 Position: 2 | | Identifier: 9 Group: 1 Position: 9 | Identifier: 10 Group: 1 Position: 10 | Identifier: 11 Group: 1 Position: 11 | Identifier: 12 Group: 2 Position: 1 | Identifier: 13 Group: 2 Position: 2 | | Identifier: 50 Group: 2 Position: 39 | Identifier: 51 Group: 2 Position: 40 | Identifier: 52 Group: 2 Position: 41 | |

Parity Group 528-1, Parity Group 528-2, Parity Tags 532

FIG. 5B

Blocks received by channel decoder

| Block 514-1 | Block 514-2 | ... | Block 514-9 | Block 514-10 |
|---|---|---|---|---|
| Identifier: 1<br>Group: 1<br>Position: 1 | Identifier: 2<br>Group: 1<br>Position: 2 | | Identifier: 9<br>Group: 1<br>Position: 9 | Identifier: 10<br>Group: 1<br>Position: 10 |

Parity Tags 532

| Block 514-49 | Block 514-50 | Parity 516-2 | ... |
|---|---|---|---|
| Identifier: 50<br>Group: 2<br>Position: 39 | Identifier: 51<br>Group: 2<br>Position: 40 | Identifier: 52<br>Group: 2<br>Position: 41 | |

Parity Tags 532

FIG. 5C

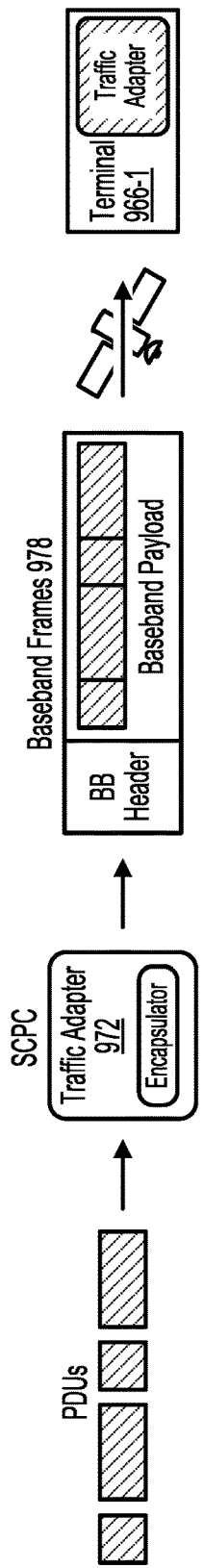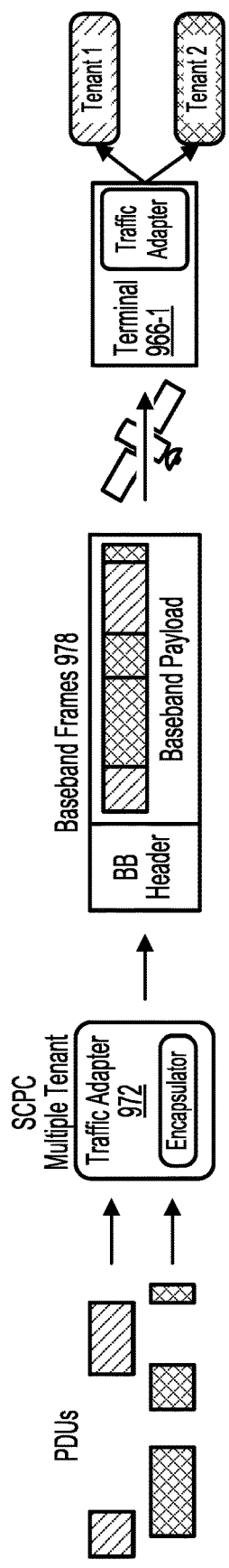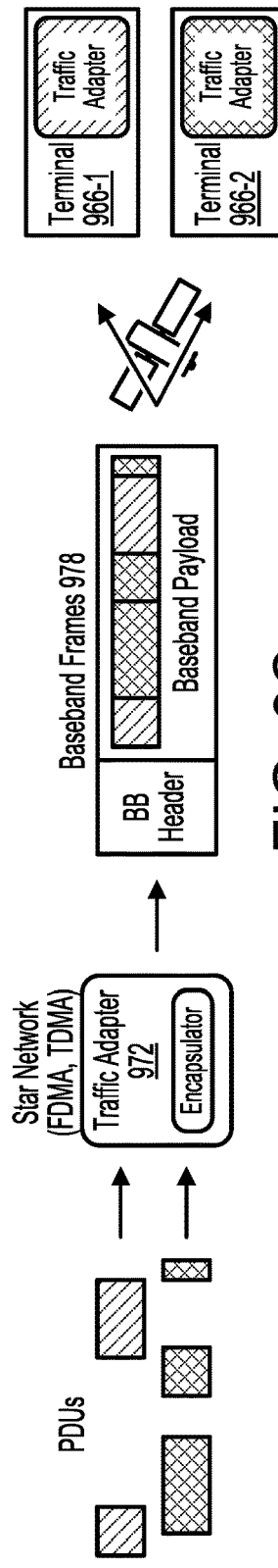

FORWARD ERROR CORRECTION WITH FLEXIBLE MATRIX FOR DYNAMIC INPUT DATA RATE

BACKGROUND OF THE INVENTION

Satellite communication systems play a crucial role in facilitating global connectivity across diverse applications, including telecommunications, broadcasting, internet services, and remote sensing. These systems operate by transmitting signals between ground-based Earth stations and satellites in orbit. The efficiency and reliability of such systems are important to addressing the increasing demands of contemporary communication and data services. Presently, communications engineers encounter numerous challenges, with a key concern being the optimization of information transmission over limited resources. Given the scarcity of available frequencies for radio signal communication and the rapid growth in the volume of information to be conveyed, there is a need to maximize the efficiency of available frequencies through the use of new hardware and software solutions at the ground stations, terminals, and satellites that make up such communication systems.

Error correction is important in satellite communications due to the inherent challenges posed by the transmission medium and the criticality of the data being transmitted. Satellites operate in environments in which the signals they relay traverse vast distances through space, encountering various sources of interference, noise, and signal degradation along the way. As a result, errors can occur during transmission, jeopardizing the integrity and reliability of the communicated data. Error correction techniques, such as Forward Error Correction (FEC), are employed to mitigate these errors by adding redundancy to the transmitted data, enabling receivers to detect and correct errors in real-time without the need for retransmissions.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of performing forward error correction in a communication system, the method comprising: receiving a set of data blocks to be transmitted over a wireless channel; forming rows of a flexible matrix using the set of data blocks based on arrival times of the set of data blocks, each of the rows corresponding to a different time window; computing a set of random parity blocks by performing row-wise parity operations on the flexible matrix; computing a set of burst parity blocks by performing column-wise parity operations on the flexible matrix in accordance with a burst parity computation scheme; and transmitting the set of data blocks, the set of random parity blocks, and the set of burst parity blocks over the wireless channel to a receiver.

Example 2 is the method of example(s) 1, further comprising: adding the set of random parity blocks to the flexible matrix; and adding the set of burst parity blocks to a last row of the flexible matrix.

Example 3 is the method of example(s) 1, wherein the wireless channel is a satellite communication channel.

Example 4 is the method of example(s) 1, wherein each of the set of random parity blocks is computed based on a random parity group comprising a subset of the set of data blocks from one or more of the rows of the flexible matrix, wherein the random parity group for each of the set of random parity blocks comprises N of the data blocks.

Example 5 is the method of example(s) 1, further comprising: selecting the burst parity computation scheme from a set of burst parity computation schemes including a first burst parity computation scheme and a second burst parity computation scheme, wherein the set of burst parity blocks are computed in accordance with the burst parity computation scheme, wherein, in the first burst parity computation scheme, the set of burst parity blocks are computed by performing column-wise parity operations independent of the set of random parity blocks, and wherein, in the second burst parity computation scheme, the set of burst parity blocks are computed by performing column-wise parity operations based on the set of random parity blocks.

Example 6 is the method of example(s) 5, wherein the burst parity computation scheme is selected based on a characterization of random and burst losses experienced by the communication system.

Example 7 is the method of example(s) 1, wherein the set of data blocks include user data received over a terrestrial network.

Example 8 is a non-transitory computer-readable medium comprising instructions that, when executed by one or more processors, cause the one or more processors to perform operations for performing forward error correction in a communication system, the operations comprising: receiving a set of data blocks to be transmitted over a wireless channel; forming rows of a flexible matrix using the set of data blocks based on arrival times of the set of data blocks, each of the rows corresponding to a different time window; computing a set of random parity blocks by performing row-wise parity operations on the flexible matrix; computing a set of burst parity blocks by performing column-wise parity operations on the flexible matrix in accordance with a burst parity computation scheme; and transmitting the set of data blocks, the set of random parity blocks, and the set of burst parity blocks over the wireless channel to a receiver.

Example 9 is the non-transitory computer-readable medium of example(s) 8, wherein the operations further comprise: adding the set of random parity blocks to the flexible matrix; and adding the set of burst parity blocks to a last row of the flexible matrix.

Example 10 is the non-transitory computer-readable medium of example(s) 8, wherein the wireless channel is a satellite communication channel.

Example 11 is the non-transitory computer-readable medium of example(s) 8, wherein each of the set of random parity blocks is computed based on a random parity group comprising a subset of the set of data blocks from one or more of the rows of the flexible matrix, wherein the random parity group for each of the set of random parity blocks comprises N of the data blocks.

Example 12 is the non-transitory computer-readable medium of example(s) 8, wherein the operations further comprise: selecting the burst parity computation scheme from a set of burst parity computation schemes including a first burst parity computation scheme and a second burst parity computation scheme, wherein the set of burst parity blocks are computed in accordance with the burst parity computation scheme, wherein, in the first burst parity computation scheme, the set of burst parity blocks are computed by performing column-wise parity operations independent of the set of random parity blocks, and wherein, in the second burst parity computation scheme, the set of burst parity blocks are computed by performing column-wise parity operations based on the set of random parity blocks.

Example 13 is the non-transitory computer-readable medium of example(s) 12, wherein the burst parity computation scheme is selected based on a characterization of random and burst losses experienced by the communication system.

Example 14 is the non-transitory computer-readable medium of example(s) 8, wherein the set of data blocks include user data received over a terrestrial network.

Example 15 is a system comprising: one or more processors; and a computer-readable medium comprising instructions that, when executed by the one or more processors, cause the one or more processors to perform operations for performing forward error correction in a communication system, the operations comprising: receiving a set of data blocks to be transmitted over a wireless channel; forming rows of a flexible matrix using the set of data blocks based on arrival times of the set of data blocks, each of the rows corresponding to a different time window; computing a set of random parity blocks by performing row-wise parity operations on the flexible matrix; computing a set of burst parity blocks by performing column-wise parity operations on the flexible matrix in accordance with a burst parity computation scheme; and transmitting the set of data blocks, the set of random parity blocks, and the set of burst parity blocks over the wireless channel to a receiver.

Example 16 is the system of example(s) 15, wherein the operations further comprise: adding the set of random parity blocks to the flexible matrix; and adding the set of burst parity blocks to a last row of the flexible matrix.

Example 17 is the system of example(s) 15, wherein the wireless channel is a satellite communication channel.

Example 18 is the system of example(s) 15, wherein each of the set of random parity blocks is computed based on a random parity group comprising a subset of the set of data blocks from one or more of the rows of the flexible matrix, wherein the random parity group for each of the set of random parity blocks comprises N of the data blocks.

Example 19 is the system of example(s) 15, wherein the operations further comprise: selecting the burst parity computation scheme from a set of burst parity computation schemes including a first burst parity computation scheme and a second burst parity computation scheme, wherein the set of burst parity blocks are computed in accordance with the burst parity computation scheme, wherein, in the first burst parity computation scheme, the set of burst parity blocks are computed by performing column-wise parity operations independent of the set of random parity blocks, and wherein, in the second burst parity computation scheme, the set of burst parity blocks are computed by performing column-wise parity operations based on the set of random parity blocks.

Example 20 is the system of example(s) 19, wherein the burst parity computation scheme is selected based on a characterization of random and burst losses experienced by the communication system.

Example 21 is a method comprising: computing a set of parity blocks by performing parity operations on a set of data blocks, each of the set of data blocks belonging to one of a set of parity groups including a first parity group and a second parity group; generating a set of parity tags for the set of data blocks, each of the set of parity tags including a unique positional identifier and a parity position number for a respective one of the set of data blocks; transmitting the set of data blocks, the set of parity blocks, and the set of parity tags over the wireless channel from a transmitter to a receiver; receiving a subset of the set of data blocks and the set of parity blocks at the receiver, the subset including a first block from the first parity group and a second block from the second parity group, the second block having been transmitted after the first block; determining, based on a parity tag for the second block, a unique positional identifier for the second block and a parity position number for the second block; computing, based on the unique positional identifier for the second block and the parity position number for the second block, a length of the first parity group; and determining that a missing block from the first parity group has not been received based on the length of the first parity group.

Example 22 is the method of example(s) 1, wherein the missing block from the first parity group is a parity block from the set of parity blocks, and wherein the method further comprises: recovering the parity block by performing parity operations on the first parity group.

Example 23 is the method of example(s) 1, wherein the missing block from the first parity group is a data block from the set of data blocks, and wherein the method further comprises: recovering the data block by performing parity operations on the first parity group.

Example 24 is the method of example(s) 1, wherein the length of the first parity group is computed further based on a unique positional identifier for the first block and a parity position number for the first block determined based on a parity tag for the first block.

Example 25 is the method of example(s) 1, further comprising: receiving, at the transmitter, the set of data blocks to be transmitted over a wireless channel, wherein the set of data blocks include user data received over a terrestrial network.

Example 26 is the method of example(s) 1, further comprising: in response to determining that the missing block from the first parity group has not been received, introducing latency at the receiver to wait for the missing block.

Example 27 is the method of example(s) 1, wherein each of the set of parity tags further includes a parity group number that identifies one of the set of parity groups.

Example 28 is one or more non-transitory computer-readable media comprising instructions that, when executed by one or more processors, cause the one or more processors to perform operations comprising: computing a set of parity blocks by performing parity operations on a set of data blocks, each of the set of data blocks belonging to one of a set of parity groups including a first parity group and a second parity group; generating a set of parity tags for the set of data blocks, each of the set of parity tags including a unique positional identifier and a parity position number for a respective one of the set of data blocks; transmitting the set of data blocks, the set of parity blocks, and the set of parity tags over the wireless channel from a transmitter to a receiver; receiving a subset of the set of data blocks and the set of parity blocks at the receiver, the subset including a first block from the first parity group and a second block from the second parity group, the second block having been transmitted after the first block; determining, based on a parity tag for the second block, a unique positional identifier for the second block and a parity position number for the second block; computing, based on the unique positional identifier for the second block and the parity position number for the second block, a length of the first parity group; and determining that a missing block from the first parity group has not been received based on the length of the first parity group.

Example 29 is the one or more non-transitory computer-readable media of example(s) 28, wherein the missing block from the first parity group is a parity block from the set of parity blocks, and wherein the operations further comprise: recovering the parity block by performing parity operations on the first parity group.

Example 30 is the one or more non-transitory computer-readable media of example(s) 28, wherein the missing block from the first parity group is a data block from the set of data blocks, and wherein the operations further comprise: recovering the data block by performing parity operations on the first parity group.

Example 31 is the one or more non-transitory computer-readable media of example(s) 28, wherein the length of the first parity group is computed further based on a unique positional identifier for the first block and a parity position number for the first block determined based on a parity tag for the first block.

Example 32 is the one or more non-transitory computer-readable media of example(s) 28, wherein the operations further comprise: receiving, at the transmitter, the set of data blocks to be transmitted over a wireless channel, wherein the set of data blocks include user data received over a terrestrial network.

Example 33 is the one or more non-transitory computer-readable media of example(s) 28, wherein the operations further comprise: in response to determining that the missing block from the first parity group has not been received, introducing latency at the receiver to wait for the missing block.

Example 34 is the one or more non-transitory computer-readable media of example(s) 28, wherein each of the set of parity tags further includes a parity group number that identifies one of the set of parity groups.

Example 35 is a system comprising: one or more processors; and one or more computer-readable media comprising instructions that, when executed by the one or more processors, cause the one or more processors to perform operations comprising: computing a set of parity blocks by performing parity operations on a set of data blocks, each of the set of data blocks belonging to one of a set of parity groups including a first parity group and a second parity group; generating a set of parity tags for the set of data blocks, each of the set of parity tags including a unique positional identifier and a parity position number for a respective one of the set of data blocks; transmitting the set of data blocks, the set of parity blocks, and the set of parity tags over the wireless channel from a transmitter to a receiver; receiving a subset of the set of data blocks and the set of parity blocks at the receiver, the subset including a first block from the first parity group and a second block from the second parity group, the second block having been transmitted after the first block; determining, based on a parity tag for the second block, a unique positional identifier for the second block and a parity position number for the second block; computing, based on the unique positional identifier for the second block and the parity position number for the second block, a length of the first parity group; and determining that a missing block from the first parity group has not been received based on the length of the first parity group.

Example 36 is the system of example(s) 35, wherein the missing block from the first parity group is a parity block from the set of parity blocks, and wherein the operations further comprise: recovering the parity block by performing parity operations on the first parity group.

Example 37 is the system of example(s) 35, wherein the missing block from the first parity group is a data block from the set of data blocks, and wherein the operations further comprise: recovering the data block by performing parity operations on the first parity group.

Example 38 is the system of example(s) 35, wherein the length of the first parity group is computed further based on a unique positional identifier for the first block and a parity position number for the first block determined based on a parity tag for the first block.

Example 39 is the system of example(s) 35, wherein the operations further comprise: receiving, at the transmitter, the set of data blocks to be transmitted over a wireless channel, wherein the set of data blocks include user data received over a terrestrial network.

Example 40 is the system of example(s) 35, wherein the operations further comprise: in response to determining that the missing block from the first parity group has not been received, introducing latency at the receiver to wait for the missing block.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIGS. 2A-2F illustrate example steps for performing FEC using a flexible matrix.

FIGS. 5A-5C illustrate example steps for performing FEC with non-deterministic parity group lengths.

FIGS. 9A-9C illustrate example traffic adapters implementing different network types.

Figure 1:
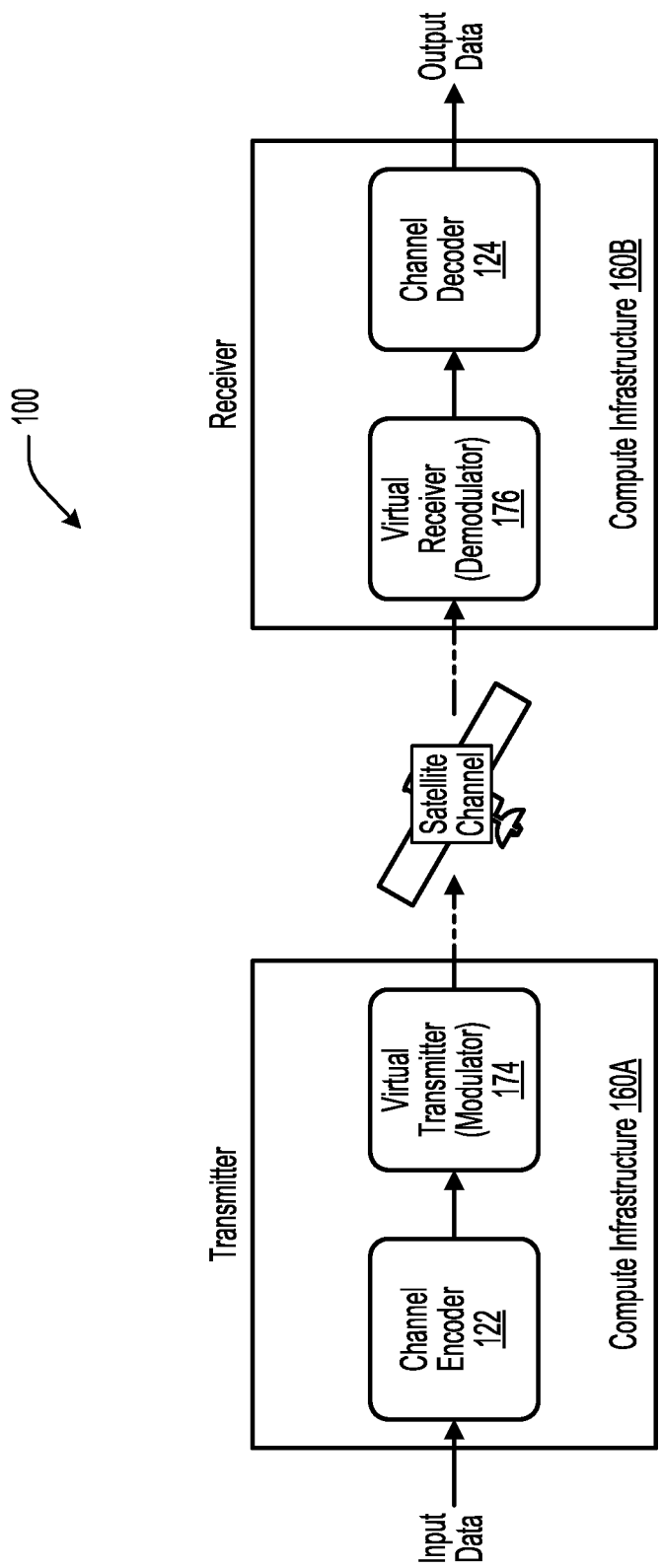
FIG. 1 illustrates an example communication system.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Forward Error Correction (FEC) techniques play an important role in ensuring reliable data transmission, particularly in scenarios such as Wi-Fi, cellular networks, and satellite communication where data loss or corruption can occur due to noise, interference, or other channel impairments. In some FEC techniques, a channel encoder is designed to add redundancy to the transmitted data in such a way that errors can be detected and corrected at the receiver end without the need for retransmission requests. By proactively addressing errors during transmission, FEC techniques reduce the need for retransmissions and improve the overall quality of service for end-users.

Random parity and burst parity are two FEC techniques that have shown to be useful for error correction within digital communication systems, particularly in the context of channel encoding. Random parity, also known as interleaved parity, is a method of introducing redundancy into a data stream by adding parity bits at regular or irregular intervals throughout the data. These parity bits may be generated based on the bits in neighboring positions or in corresponding positions across multiple data frames or packets. Random parity can be used to detect and/or correct errors that occur randomly throughout the transmission. At the receiving end, the same parity calculation is performed on the received data, and any discrepancies between the received parity bits and the calculated parity bits indicate the presence of errors. Depending on the severity of the errors, the receiver may attempt to correct them using the redundancy provided by the parity bits. In some cases, the received data may include packet losses (in which no received bits are present) for which the parity bits may directly be used to perform data recovery.

Burst parity, also known as burst error correction, is a technique specifically designed to address burst errors, where consecutive bits in the data stream are corrupted simultaneously. Unlike random parity, which spreads redundancy evenly across the data, burst parity focuses on detecting and correcting burst errors efficiently. In burst parity, additional redundancy is introduced into the data stream in such a way that it can detect and correct bursts of errors up to a certain length. This is typically achieved using specialized error-correcting codes, such as Reed-Solomon codes or cyclic redundancy check (CRC) codes, which are capable of detecting and correcting burst errors.

In some conventional techniques, FEC may be a protection mechanism attached to User Datagram Protocol (UDP) packets to protect against packet loss. In such techniques, the input rate is assumed to be steady, and if the input data rate turns out to vary, extra "noise" may be padded to protect a certain number of packets. The addition of the extra noise or placeholder data can lead to decreased efficiency, particularly in cases where the input data rate varies drastically. The inability to efficiently support a dynamic input data rate renders many of the conventional FEC techniques unsuitable for many modern data transmission applications.

Some embodiments of the present disclosure relate to techniques for performing FEC using random and burst parities in a communication system with a dynamic input data rate. When data packets (alternatively referred to herein as "data blocks") arrive at a transmitter, they are placed in a flexible matrix. The length of each row of the matrix is determined by how many packets are received within a time window. Each successive row may vary in length compared to prior rows. To protect against a random loss, a parity packet (alternatively referred to herein as a "parity block") may be added to the matrix after N packets are received, where N is a constant or is variably controlled by the transmitter. The data this packet/block contains is the parity addition (e.g., using an XOR operation) of the previous N packets/blocks. Once enough packets/blocks are received, a row of parity packets/blocks may be added to the matrix to protect against a burst loss. This parity row may be formed by using Interleaved Parity Groups (IPG), which may be the parity addition of all packets/blocks in a column, supporting dynamic column sizes.

By forming a flexible matrix at the transmitter, the size of the matrix becomes non-deterministic to the receiver. For example, the receiver may not know the number of packets that are in a row until all packets in that row are received. Furthermore, the number of packets in parity groups may also be non-deterministic due to the dynamic nature of the flexible matrix. Some embodiments of the present disclosure relate to a FEC technique in which a length of a parity group (i.e., the number of packets in the parity group) can be quickly determined by examining a parity tag (e.g., included in a packet header) associated with a single packet in a subsequent parity group. The parity tag may include a unique positional identifier that indicates the unique position or coordinate of the associated packet within the flexible matrix, a parity group number indicating which parity group the associated packet belongs to, and a parity position number indicating the associated packet's position within the parity group.

Once the length of the parity group is known, the channel decoder at the receiver can use the parity packet to recover a lost packet from the parity group. Alternatively, if the parity packet itself is lost, the data packets from the parity group can be used to recover the parity packet, which can be beneficial in situations where both random parity groups and burst parity groups are in use. For example, if a random parity packet is part of a burst parity group, the burst parity packet for that burst parity group will be unable to recover a lost data packet unless the data for the random parity packet is also available.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example communication system 100, in accordance with some embodiments of the present disclosure. Communication system 100 may be a satellite communication system or other wireless communication system in which data is transmitted over a wireless channel (e.g., a satellite channel, a cell phone channel, a high-frequency channel, a microwave radio channel, etc.). In the illustrated example, communication system 100 includes a compute infrastructure 160A running one or more virtual network functions (VNFs) at a transmitter and a compute infrastructure 160B running one or more VNFs at a receiver. VNFs at the transmitter may include a channel encoder 122 and a virtual transmitter 174 (e.g., a modulator) and VNFs at the receiver may include a virtual receiver 176 (e.g., a demodulator) and a channel decoder 124.

The input data received by the transmitter is the digital data to be communicated over the wireless channel. The input data may comprise a set of data packets (alternatively referred to as "data blocks"). The data rate of the input data (or "input data rate") may be dynamic, arriving at irregular intervals from a source. The input data may be encoded by channel encoder 122 using one or more of the FEC techniques described herein. Channel encoder 122 may add redundant information to the input symbols or bits in a way that allows errors or lost data to be corrected. Virtual transmitter 174 may convert bits or symbol sequences from channel encoder 122 into a signal suitable for transmission over the wireless channel.

Virtual receiver 176 may receive the signal from the channel and convert it into a sequence of symbols or bits. This may include functions such as filtering, demodulation, carrier synchronization, symbol timing estimation, frame synchronization, and matched filtering, followed by a detection step in which decisions about the transmitted symbols are made. Channel decoder 124 may exploit the redundancy introduced by channel encoder 122 to correct any errors that may have been introduced. Channel decoder 124 may use one or more of the FEC techniques described herein to recover the original transmitted data. The output data generated by channel decoder 124 may be sent to an ultimate destination of the data (e.g., an application). In some cases, the functionality of virtual receiver 176 and channel decoder 124 may be combined. In some cases, the functionality of channel encoder 122 and virtual transmitter 174 may be combined.

Figure 2A:
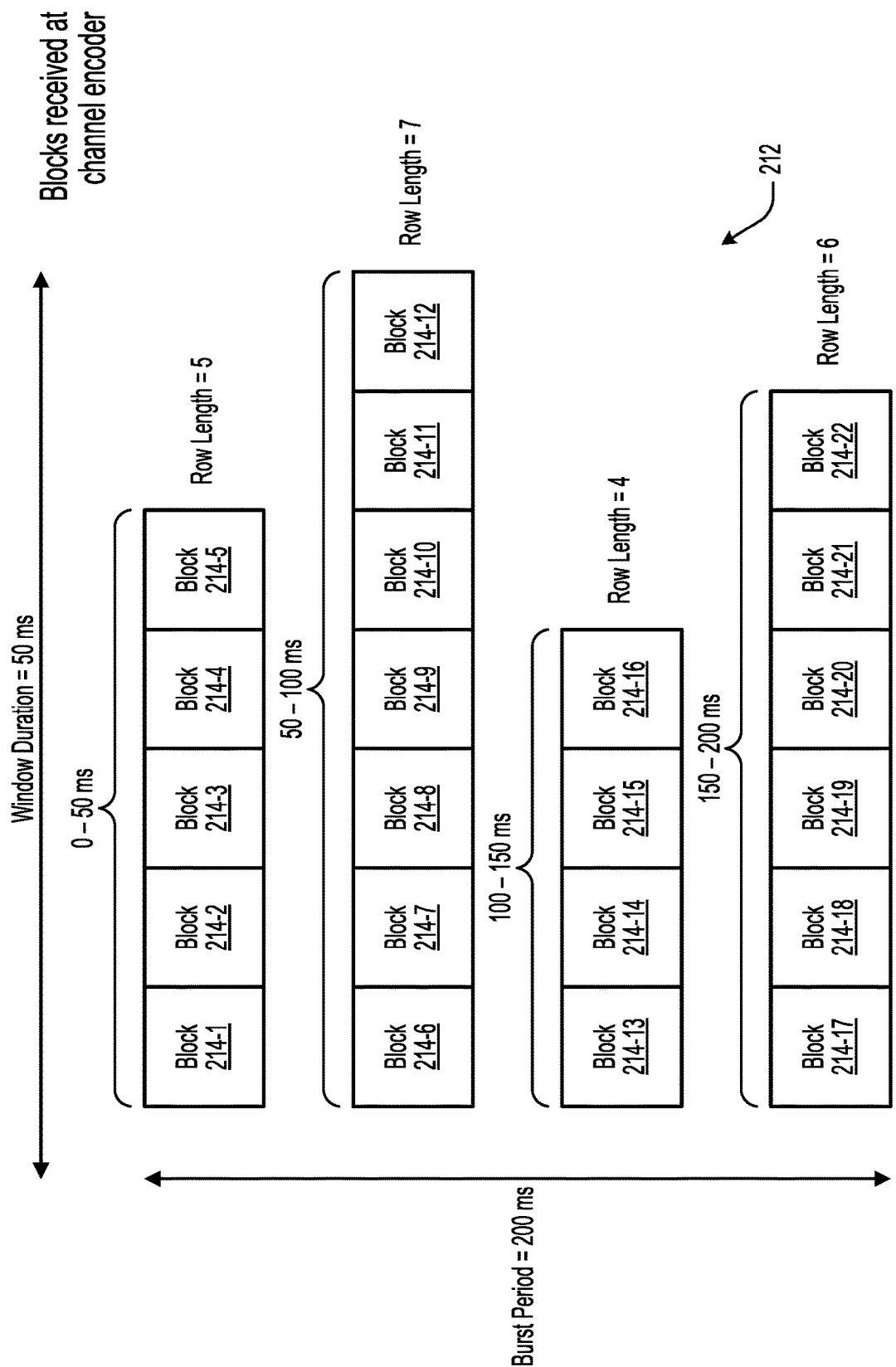

FIGS. 2A-2F illustrate example steps for performing FEC using a flexible matrix, in accordance with some embodiments of the present disclosure. FIG. 2A shows the formation of a flexible matrix 212 at a channel encoder using received data blocks 214. Each of data blocks 214 may represent a section of the input data to the transmitter. In some examples, each of data blocks 214 may represent the payload of a data packet, such as an Ethernet packet, an IP packet, a UDP packet, or a signal data packet. Each of the rows of flexible matrix 212 may include data blocks 214 received during a particular time window. Each of the time windows may have the same window duration (e.g., 50 ms) but with different row lengths based on the number of data blocks 214 received during the time windows. The number of rows in flexible matrix 212 may be determined based on the window duration and a burst period (e.g., 200 ms) by, for example, dividing the burst period by the window duration (e.g., 200/50=4 rows).

In the illustrated example, data blocks 214-1 to 214-5 are received during a first time window between 0 to 50 ms and are used to form a first row of flexible matrix 212 (corresponding to a row length of 5), data blocks 214-6 to 214-12 are received during a second time window between 50 to 100 ms and are used to form a second row of flexible matrix 212 (corresponding to a row length of 7), data blocks 214-13 to 214-16 are received during a third time window between 100 to 150 ms and are used to form a third row of flexible matrix 212 (corresponding to a row length of 4), and data blocks 214-17 to 214-22 are received during a fourth time window between 150 to 200 ms and are used to form a fourth row of flexible matrix 212 (corresponding to a row length of 6). Flexible matrix 212 may be expanded along different dimensions as data blocks 214 are received during new time windows (e.g., by appending rows) or as a new maximum row lengths are obtained (e.g., by appending columns).

Figure 2B:
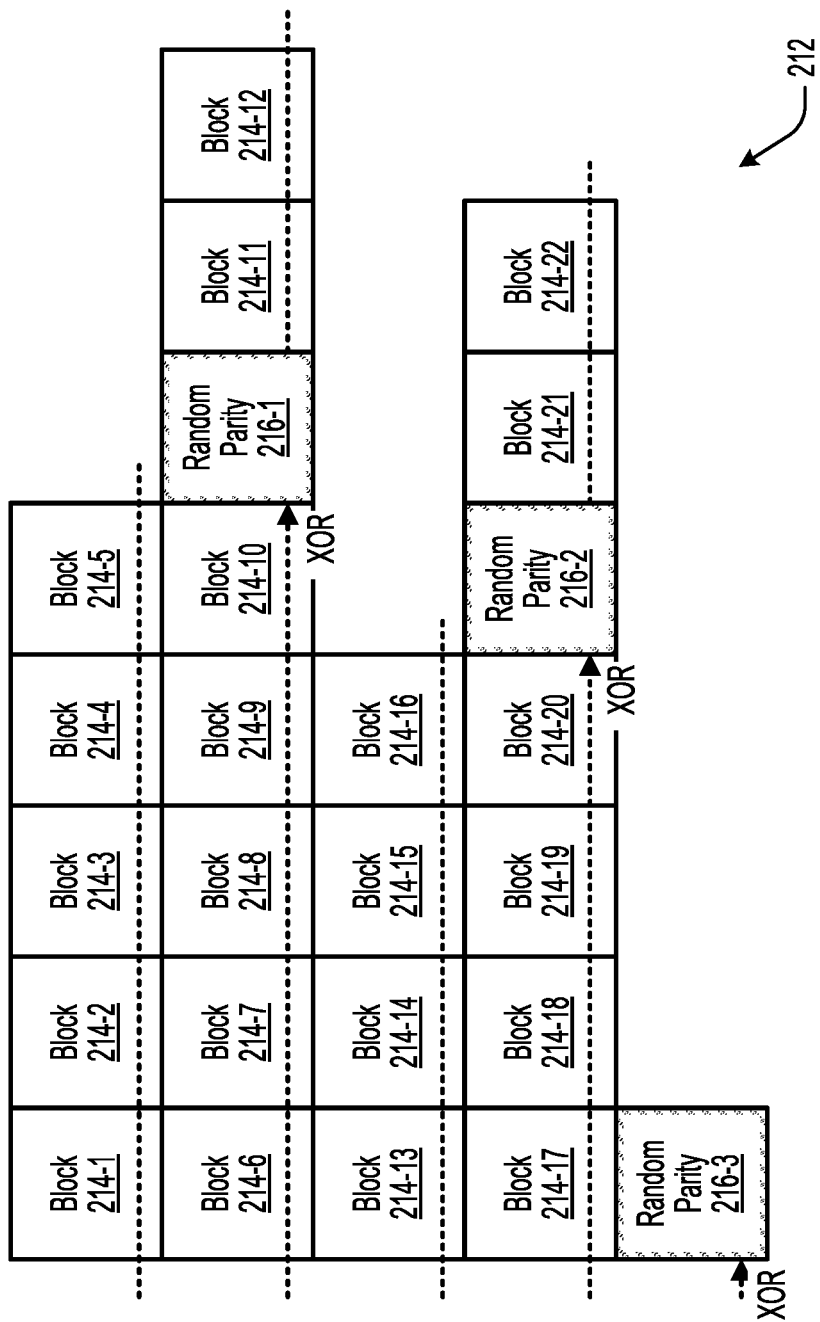

FIG. 2B shows the computing and adding of random parity blocks 216 (e.g., random parity packets) to flexible matrix 212. Based on the estimated or measured frequency of random losses experienced by the communication system, the channel encoder may determine to protect against a 10% random loss by adding random parity blocks 216 to flexible matrix 212 after every 10 (i.e., N=10) data blocks 214. Each of random parity blocks 216 may be computed by performing row-wise parity operations (e.g., XOR operations) on the preceding 10 data blocks 214. For example, random parity block 216-1 may be computed by performing an XOR operation on data blocks 214-1 to 214-10 and may be added to flexible matrix 212 after data block 214-10, random parity block 216-2 may be computed by performing an XOR operation on data blocks 214-11 to 214-20 and may be added to flexible matrix 212 after data block 214-20, and random parity block 216-3 may be computed by performing an XOR operation on data blocks 214-21 to 214-22 and may be added to flexible matrix 212 after data block 214-22. While random parity block 216-3 is shown as being added to its own row, in some examples it may be added to the end of the $4^{th}$ row.

Figure 2C:
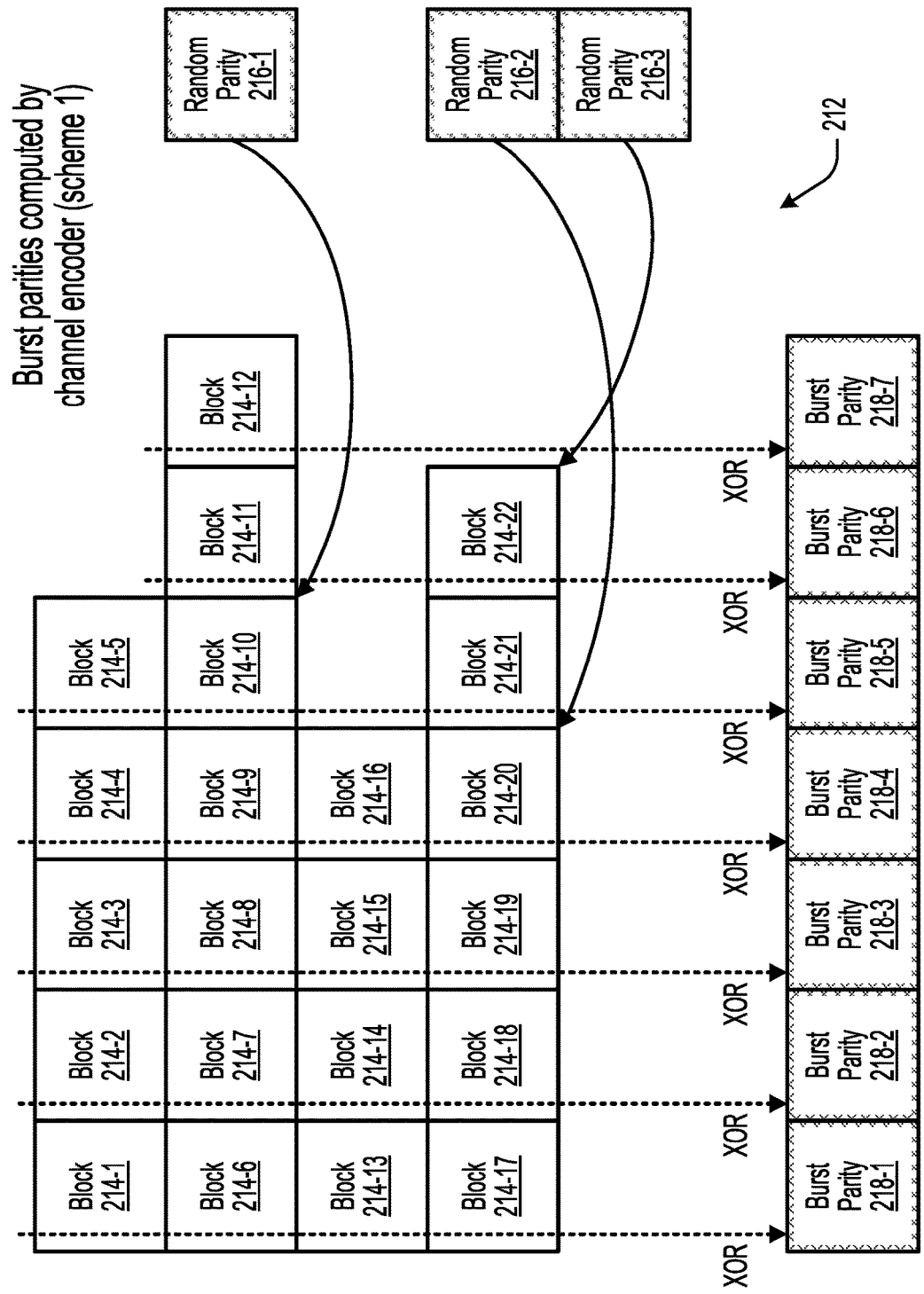

FIG. 2C shows the computing and adding of burst parity blocks 218 (e.g., burst parity packets) to flexible matrix 212 in accordance with a first burst parity computation scheme. Based on the estimated or measured frequency and duration of burst losses experienced by the communication system, the channel encoder may determine to add a row of burst parity blocks 218 after a burst period of 200 ms (including 4 time windows of 50 ms) to protect against a burst loss of 50 ms. In the first burst parity computation scheme, burst parity blocks 218 are computed by performing column-wise parity operations (e.g., XOR operations) independent of random parity blocks 216, which are temporarily removed from flexible matrix 212 causing data blocks 214-11, 214-12, 214-21, and 214-22 to be shifted left.

For example, burst parity block 218-1 may be computed by performing an XOR operation on data blocks 214-1, 214-6, 214-13, and 214-17, burst parity block 218-2 may be computed by performing an XOR operation on data blocks 214-2, 214-7, 214-14, and 214-18, burst parity block 218-3 may be computed by performing an XOR operation on data blocks 214-3, 214-8, 214-15, and 214-19, burst parity block 218-4 may be computed by performing an XOR operation on data blocks 214-4, 214-9, 214-16, and 214-20, burst parity block 218-5 may be computed by performing an XOR operation on data blocks 214-5, 214-10, and 214-21, burst parity block 218-6 may be computed by performing an XOR operation on data blocks 214-11 and 214-22, and burst parity block 218-7 may be computed based on data block 214-12.

On the receiving side, if data block 214-17 is lost, either parity addition based on data blocks 214-1, 214-6, and 214-13 and burst parity block 218-1 or parity addition based on data blocks 214-11 to 214-16 and 214-18 to 214-20 and random parity block 216-2 will correct data block 214-17. If data block 214-6, 214-7, and 214-17 are lost, then, for example, parity addition based on data block 214-11 to 214-16 and 214-18 to 214-20 and random parity block 216-2 will correct data block 214-17, parity addition based on data blocks 214-1, 214-13, and 214-17 and burst parity block 218-1 will correct data block 214-6, and parity addition based on data blocks 214-1 to 214-6 and 214-8 to 214-10 and random parity block 216-1 will correct data block 214-7. Instead of performing the operations in this sequence, parity addition based on data blocks 214-2, 214-14, and 214-18 and burst parity block 218-2 can correct data block 214-7 first. Then, with the random protection of parity addition based on data blocks 214-1 to 214-5 and 214-7 to 214-10 and random parity block 216-1, data block 214-6 can be corrected next. Finally, the burst protection of parity addition based on data blocks 214-1, 214-6, and 214-13 and burst parity block 218-1 can correct data block 214-17.

Figure 2D:
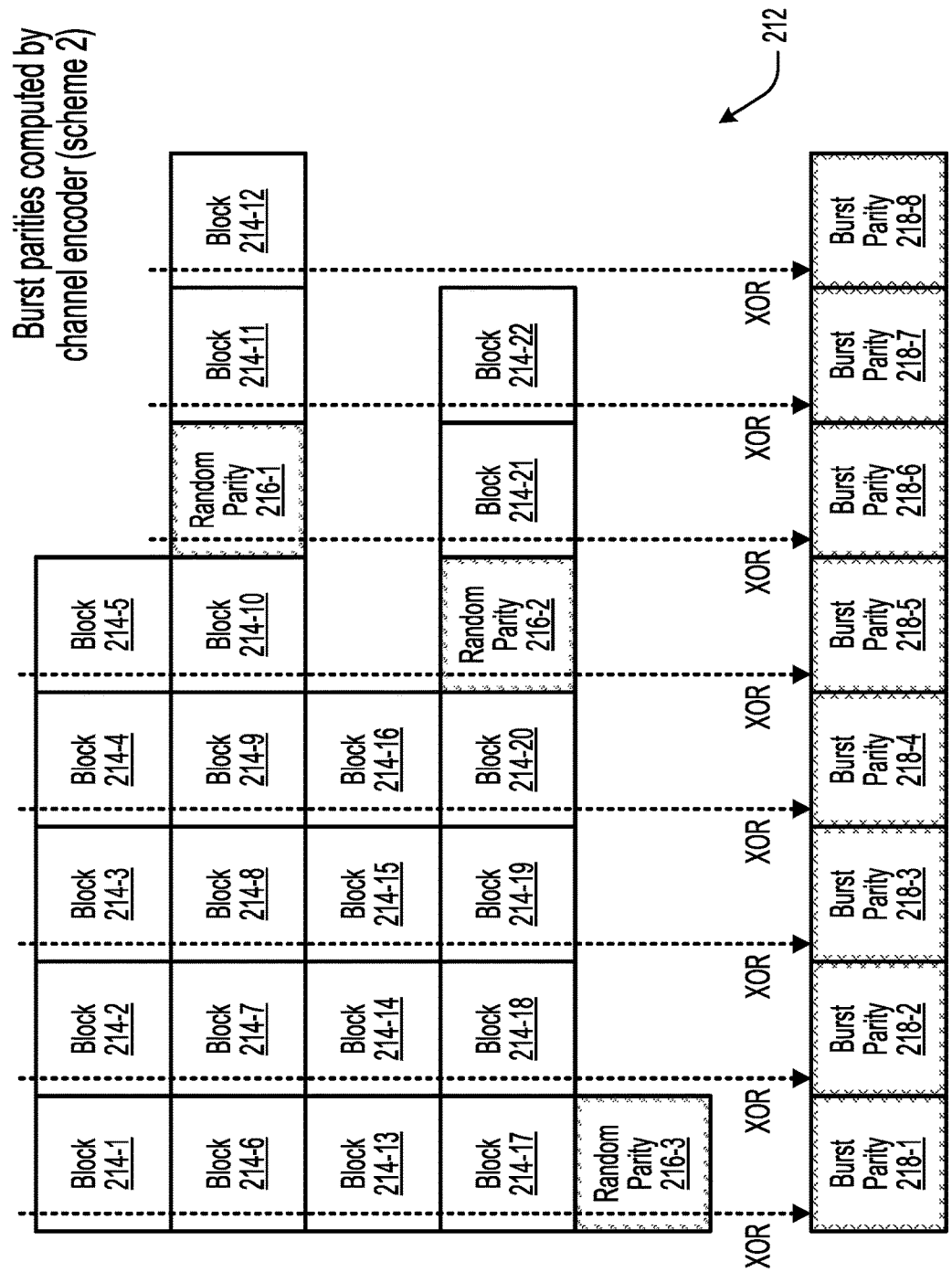

FIG. 2D shows the computing and adding of burst parity blocks 218 (e.g., burst parity packets) to flexible matrix 212 in accordance with a second burst parity computation scheme. Based on the estimated or measured frequency and duration of burst losses experienced by the communication system, the channel encoder may determine to add a row of burst parity blocks 218 after a burst period of 200 ms (including 4 time windows of 50 ms) to protect against a burst loss of 50 ms. In the second burst parity computation scheme, burst parity blocks 218 are computed by performing column-wise parity operations (e.g., XOR operations) based on data blocks 214 and random parity blocks 216.

For example, burst parity block 218-1 may be computed by performing an XOR operation on data blocks 214-1, 214-6, 214-13, and 214-17 and random parity block 216-3, burst parity block 218-2 may be computed by performing an XOR operation on data blocks 214-2, 214-7, 214-14, and 214-18, burst parity block 218-3 may be computed by performing an XOR operation on data blocks 214-3, 214-8, 214-15, and 214-19, burst parity block 218-4 may be computed by performing an XOR operation on data blocks 214-4, 214-9, 214-16, and 214-20, burst parity block 218-5 may be computed by performing an XOR operation on data blocks 214-5 and 214-10 and random parity block 216-2, burst parity block 218-6 may be computed by performing an XOR operation on random parity block 216-1 and data block 214-21, burst parity block 218-7 may be computed by performing an XOR operation on data blocks 214-11 and 214-22, and burst parity block 218-8 may be computed based on data block 214-12.

On the receiving side, if data block 214-17 is lost, either parity addition based on data blocks 214-1, 214-6, 214-13, random parity block 216-3, and burst parity block 218-1 or parity addition based on data blocks 214-11 to 214-16 and 214-18 to 214-20 and random parity block 216-2 will correct data block 214-17. If data blocks 214-6, 214-7, and 214-17 are lost, then, for example, parity addition based on data blocks 214-11 to 214-16 and 214-18 to 214-20 and random parity block 216-2 will correct data block 214-17, parity addition based on data blocks 214-1, 214-13, and 214-17, random parity block 216-3, and burst parity block 218-1 will correct data block 214-6, and parity addition based on data blocks 214-1 to 214-6 and 214-8 to 214-10 and random parity block 216-1 will correct data block 214-7. Instead of performing the operations in this sequence, parity addition based on data blocks 214-2, 214-14, and 214-18 and burst parity block 218-2 can correct data block 214-7 first. Then, with the random protection of parity addition based on data blocks 214-1 to 214-5 and 214-7 to 214-10 and random parity block 216-1, data block 214-6 can be corrected next. Finally, the burst protection of parity addition based on data blocks 214-1, 214-6, and 214-13, random parity block 216-3, and burst parity block 218-1 can correct data block 214-17.

Figure 2E:
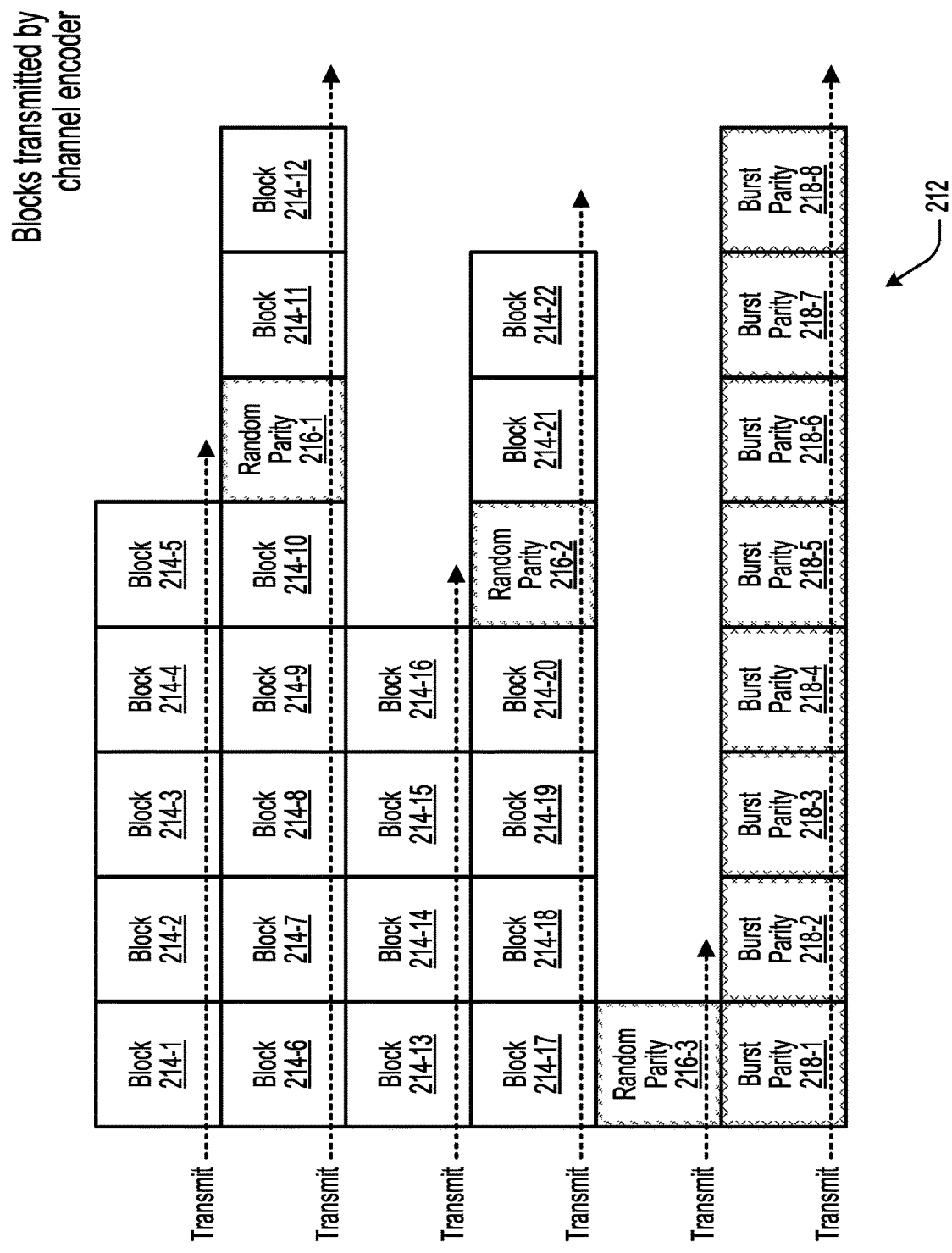

FIG. 2E shows the release and transmitting of data blocks 214, random parity blocks 216, and burst parity blocks 218 of flexible matrix 212 from the transmitter to the receiver of the communication system. All illustrated blocks are transmitted regardless of whether the first burst parity computation scheme or the second burst parity computation scheme is selected. Blocks may be transmitted left-to-right and top-to-bottom as shown, with data blocks 214-1 to 214-5 transmitted first and burst parity blocks 218-1 to 218-8 transmitted last.

Figure 2F:
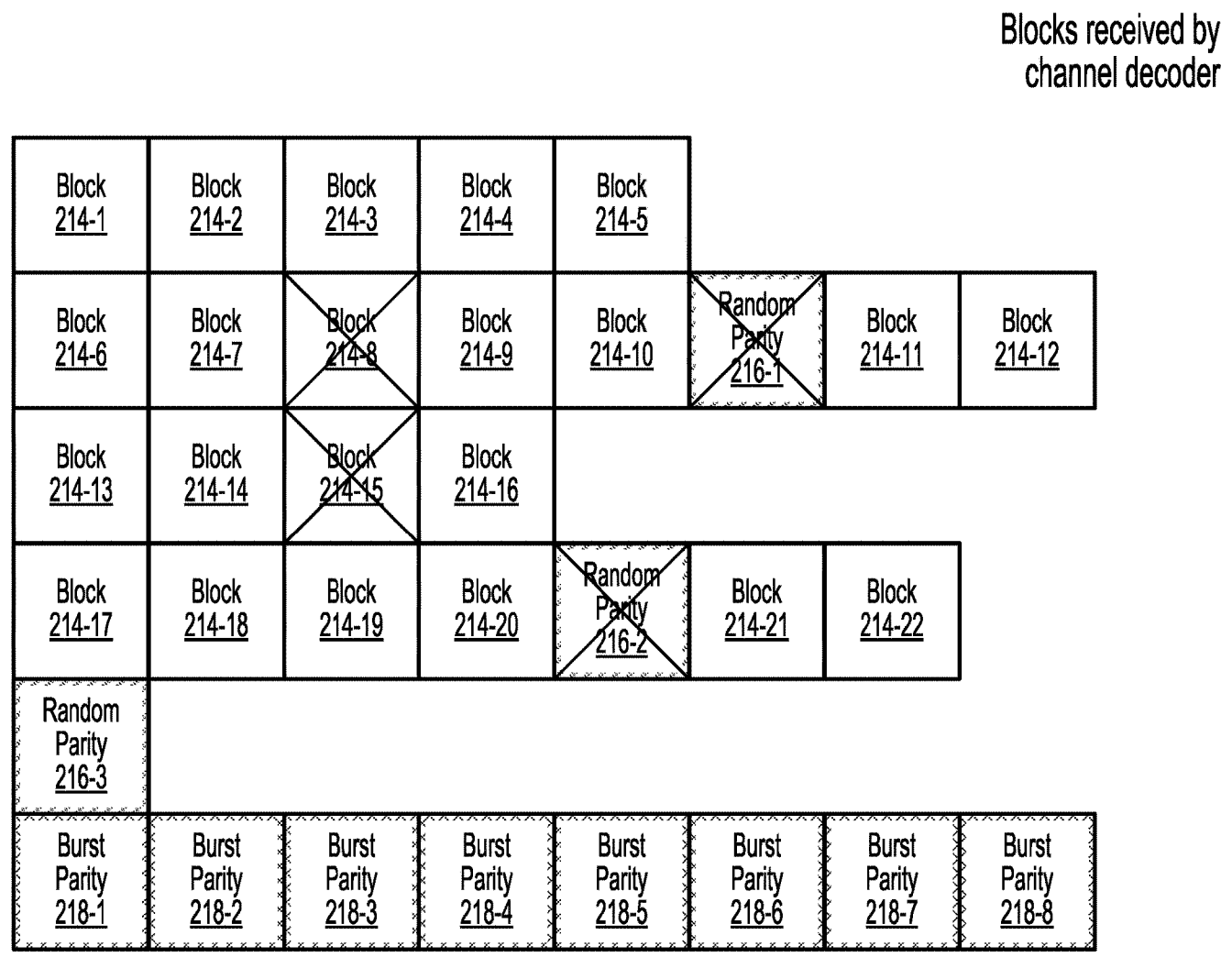

FIG. 2F shows the receiving of data blocks 214, random parity blocks 216, and burst parity blocks 218 by the channel decoder in the receiver of the communication system. In the illustrated example, data blocks 214-8 and 214-15 and random parity blocks 216-1 and 216-2 were lost or corrupted during transmission. The benefit of adding random parities to the matrix is that burst protection can be used to correct a random parity. This in turn may correct a block that burst protection may not be able to protect, for example if another block in the same column is missing.

With the first burst parity computation scheme described in reference to FIG. 2C, random parity blocks 216 were temporarily removed or ignored from the matrix so that burst parity blocks 218 could be computed independent of random parity blocks 216. As such, random parity blocks 216-1 and 216-2 would not be restored using burst protection. Since two blocks in the first random parity group were lost (data block 214-8 and random parity block 216-1), random correction cannot correct either of those two blocks. Similarly, two blocks in the second random parity group were lost (data block 214-15 and random parity block 216-2), so random correction cannot correct either of those two blocks. Finally, data blocks 214-8 and 214-15 are in the same burst parity group, so burst protection cannot correct either of those two blocks. As such, this loss cannot be corrected with the first burst parity computation scheme.

With the second burst parity computation scheme described in reference to FIG. 2D, random parity blocks 216 are considered when computing burst parity blocks 218, so random parity block 216-2 can be restored using burst protection, which would be corrected using parity addition based on data blocks 214-5 and 214-10 and burst data block 218-5. Next, random correction using parity addition based on data blocks 214-11 to 214-14 and 214-16 to 214-20 and random parity block 216-2 would correct data block 214-15. Finally, burst correction using parity addition based on data blocks 214-3, 214-15, and 214-19 and burst parity block 218-3 would correct data block 214-8. With all the data blocks having been corrected, it is optional whether to also correct random parity block 216-1.

It can be observed that there may be multiple ways to correct a loss. For example, instead of correcting random parity block 216-2, parity addition based on data block 214-21 and burst parity block 218-6 could be performed to correct random parity block 216-1. This, in turn, can correct data block 214-8 with parity addition based on data blocks 214-1 to 214-7 and 214-9 to 214-10 and random parity block 216-1. Data block 214-15 can now be corrected using either burst protection using parity addition based on data blocks 214-3, 214-8, and 214-19 and random parity block 216-3 or burst correcting random parity block 216-2 with parity addition based on data blocks 214-5 and 214-10 and burst parity block 218-5 and then using random protection with parity addition based on data blocks 214-11 to 214-14 and 214-16 to 214-20 and random parity block 216-2. It can thus be observed that adding random parities to the burst parity groups can help correct data blocks, and depending on the network conditions and the specific application, it can be advantageous to switch to the second burst parity computation scheme to protect against these types of packet losses.

Figure 3:
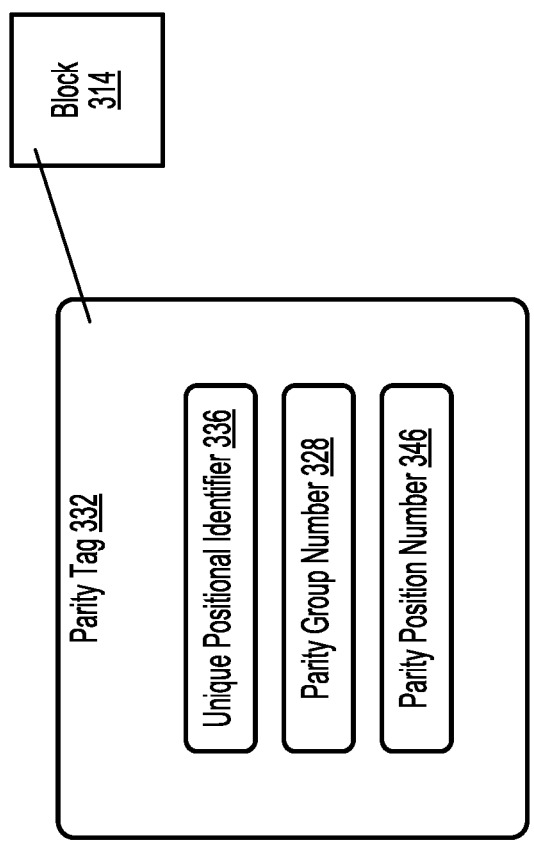
FIG. 3 illustrates an example parity tag associated with a data block.

FIG. 3 illustrates an example parity tag 332 associated with a data block 314, in accordance with some embodiments of the present disclosure. Parity tag 332 may be generated by a channel encoder and included in a packet header along with data block 314 in the packet payload for transmission to the receiver. Parity tag 332 may allow the channel decoder to recover data when the parity group length is non-deterministic. In the illustrated example, parity tag 332 includes a unique positional identifier 336 that indicates the unique position or coordinate of data block 314 within the flexible matrix (e.g., the unique consecutive value, whether it be a one-dimensional value or multi-dimensional coordinate values), a parity group number indicating which parity group data block 314 belongs to, and a parity position number indicating the position of data block 314 within the parity group identified by parity group number 328. Similar parity tags to parity tag 332 may be generated for other transmitted blocks such as random parity blocks and burst parity blocks.

Figure 4:
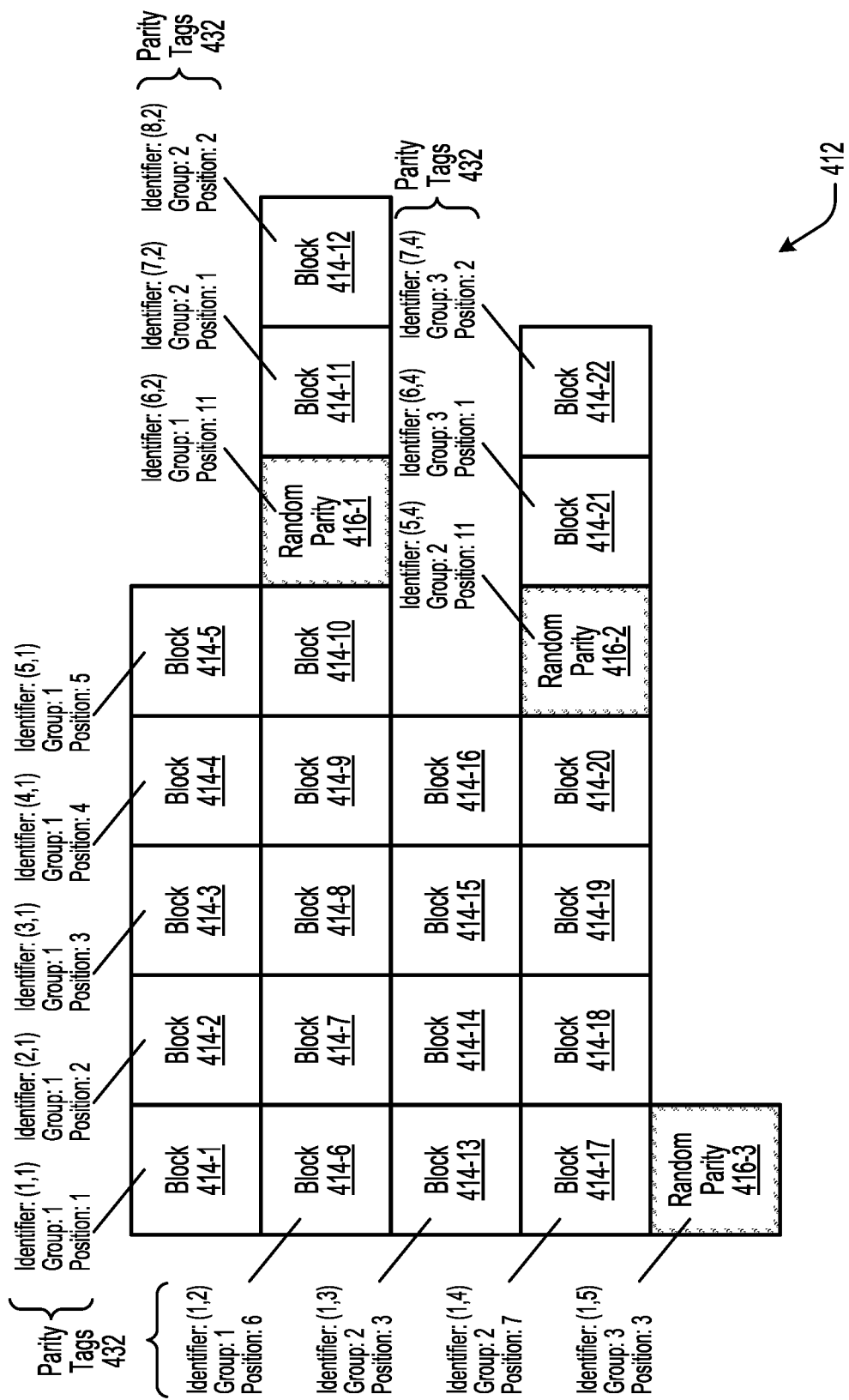
FIG. 4 illustrates example parity tags generated by a channel encoder for blocks in a flexible matrix.

FIG. 4 illustrates example parity tags 432 generated by a channel encoder for blocks in a flexible matrix 412, in accordance with some embodiments of the present disclosure. Several examples of generated parity tags are provided as follows. For data block 414-1, parity tag 432 includes a unique positional identifier of 1,1 (column 1, row 1), a parity group number of 1 (first parity group), and a parity position number of 1 (first block in the first parity group). For data block 414-2, parity tag 432 includes a unique positional identifier of 2,1 (column 2, row 1), a parity group number of 1 (first parity group), and a parity position number of 2 (second block in the first parity group). For random parity block 416-1, parity tag 432 includes a unique positional identifier of 6,2 (column 6, row 2), a parity group number of 1 (first parity group), and a parity position number of 11 ($11^{th}$ block in the first parity group).

For data block 414-11, parity tag 432 includes a unique positional identifier of 7,2 (column 7, row 2), a parity group number of 2 (second parity group), and a parity position number of 1 (first block in the second parity group). For random data block 416-2, parity tag 432 includes a unique positional identifier of 5,4 (column 5, row 4), a parity group number of 2 (second parity group), and a parity position number of 11 ($11^{th}$ block in the second parity group). For data block 414-21, parity tag 432 includes a unique positional identifier of 6,4 (column 6, row 4), a parity group number of 3 (third parity group), and a parity position number of 1 (first block in the third parity group).

FIGS. 5A-5C illustrate example steps for performing FEC with non-deterministic parity group lengths, in accordance with some embodiments of the present disclosure. FIG. 5A shows a set of data blocks 514 that are received at a channel encoder. Each of data blocks 514 may represent a section of the input data to the transmitter. In some examples, each of data blocks 514 may represent the payload of a data packet, such as an Ethernet packet, an IP packet, a UDP packet, or a signal data packet. Data blocks 514 may be used to form a flexible matrix as described in reference to FIGS. 2A-2F.

In FIG. 5B, the channel encoder forms parity groups 528 and computes parity blocks 516 based on respective data blocks 514 within parity groups 528. For example, parity block 516-1 may be computed by performing parity addition operations (e.g., XOR operations) based on data blocks 514-1 to 514-10 and parity block 516-2 may be computed by performing parity addition operations (e.g., XOR operations) based on data blocks 514-11 to 514-50. After forming parity groups 528, the channel encoder may generate parity tags 532 for data blocks 514 and parity blocks 516, each of parity tags 532 including a unique positional identifier, a parity group number, and a parity position number. Data blocks 514, parity blocks 516, and parity tags 532 are then transmitted from the transmitter to the receiver of the communication system.

FIG. 5C shows the blocks received by the channel decoder. In the illustrated example, data blocks 514-1 to 514-10, 514-49, and 514-50 and parity block 516 have been received while data blocks 514-11 to 514-48 and parity block 516-1 have not arrived. Although data blocks 514-1 to 514-10 have been received, the channel decoder is unable to determine the length of the first parity group without examining a parity tag for a block in the second parity group. Formulaically, once any block $B_2$ from parity group $G_2$ is received, then the last block $B_{1L}$ from parity group $G_1$ will have the unique positional identifier $I(B_{1L})$ (if one-dimensional), of:

$$I(B_{1L})=I(B_2)-P(B_2) \quad (1)$$

where $P(B_2)$ is the parity position number of block $B_2$ and $I(B_2)$ is the unique positional identifier of block $B_2$. Using the unique positional identifier $I(B_{1L})$ of the last block from parity group $G_1$, the length $L_1$ of parity group $G_1$ can be determined using the unique positional identifier $I(B_1)$ and parity position number $P(B_1)$ of any other block $B_1$ from parity group $G_1$ as follows:

$$L_1=I(B_{1L})-I(B_1)+P(B_1) \quad (2)$$

Using Equations 1 and 2, the channel decoder may compute the length of parity group 528-1 using the parity tags 532 for data block 514-49 (or any other received block from parity group 528-2) and data block 514-9 (or any other received block from parity group 528-1). Data block 514-49 includes a unique positional identifier of 50 (i.e., $I(B_2)=50$) and a parity group number of 39 (i.e., $P(B_2)=39$) and data block 514-9 includes a unique positional identifier of 9 (i.e., $I(B_1)=9$) and a parity group number of 9 (i.e., $P(B_1)=9$). First, the unique positional identifier of the last block of parity group 528-1 is computed as 11 (i.e., $I(B_{1L})=I(B_2)-P(B_2)=50-39=11$). Next, the length of parity group 528-1 is also computed as 11 (i.e., $L_1=I(B_{1L})-I(B_1)+P(B_1)=11-9+9=11$). The same length can be computed using parity block 516-2 (from parity group 528-2) and data block 514-2 (from parity group 528-1). The unique positional identifier of the last block of parity group 528-1 is computed as 11 (i.e., $I(B_{1L})=I(B_2)-P(B_2)=52-41=11$) and the length of parity group 528-1 is computed as 11 (i.e., $L_1=I(B_{1L})-I(B_1)+P(B_1)=11-2+2=11$). While it was the case in this example, in some examples the unique positional identifier $I(B_{1L})$ may not be equal to the length $L_1$ (for example, when parity group $G_1$ is not the first parity group, $I(B_{1L})$ and $L_1$ may not be equal).

Once the length of parity group 528-1 is determined, the channel decoder can determine how many blocks from parity group 528-1 are missing. In the illustrated example, since the channel decoder has received data blocks 514-1 to 514-10, it can determine that only a single block is missing. Furthermore, since a parity block has not yet been received for parity group 528-1, the channel decoder can determine that the single missing block is a parity block. The channel decoder can then perform parity addition operations (e.g., XOR operations based on data blocks 514-1 to 514-10) to recover the data for parity block 516-1. It should be noted that the parity block need not be the last block in the parity group, which may instead be a data block. In such cases, the channel decoder can perform parity addition operations (e.g., XOR operations based on the data blocks and parity block) to recover the data for the missing data block. In some examples, the channel decoder may instead wait to receive the missing block before performing any corrections. For example, the channel decoder may choose to introduce latency into the communication system to wait for any missing blocks.

Figure 6:
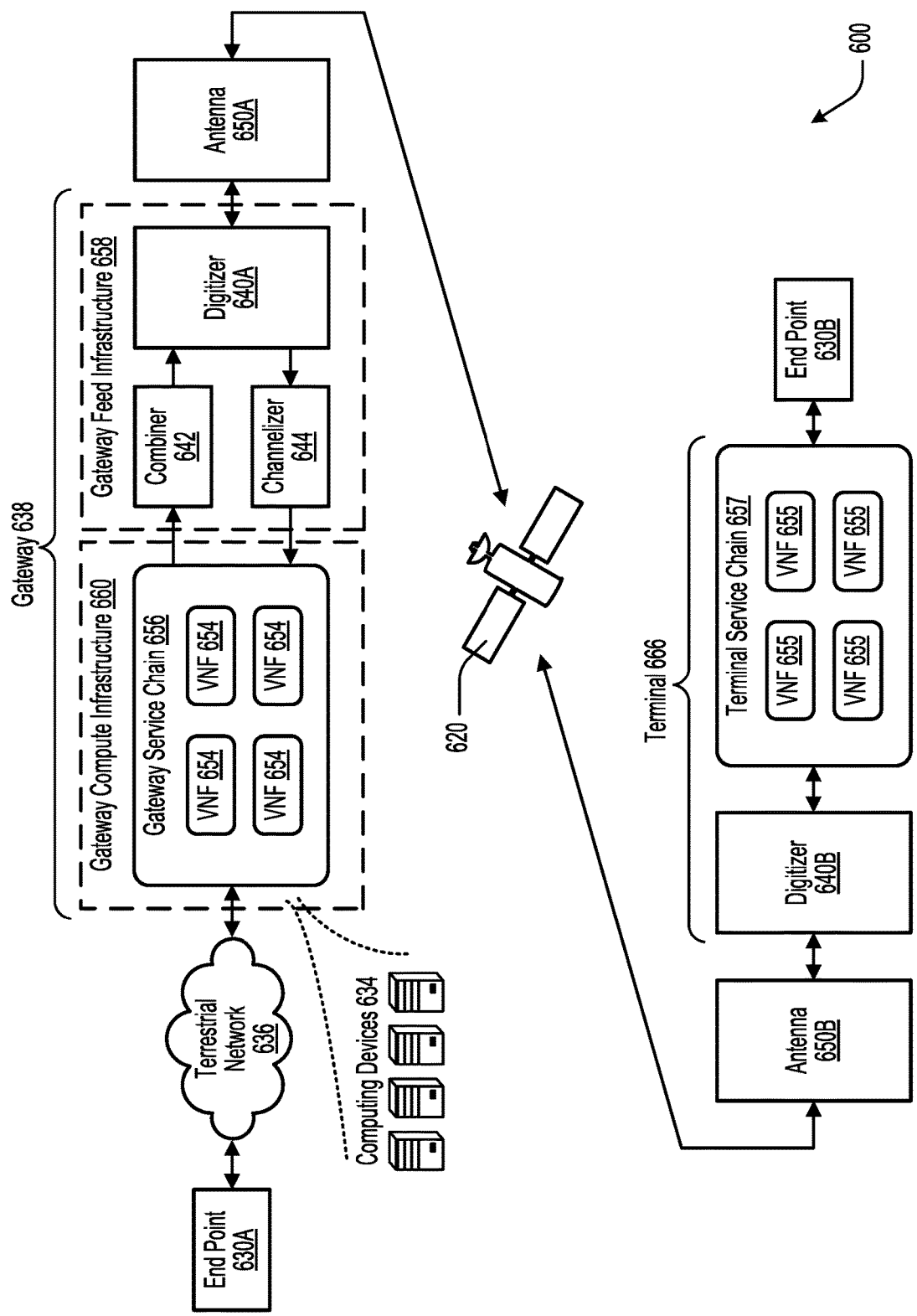
FIG. 6 illustrates an example communication path between end points enabled by a satellite communication system.

FIG. 6 illustrates an example communication path between an end point 630A and an end point 630B enabled by a satellite communication system 600, in accordance with some embodiments of the present disclosure. In the illustrated example, satellite communication system 600 includes a gateway 638 in communication with a terminal 666 via a satellite 620. In various examples, satellite 620 may send and receive wireless signals within one or more bands of a number of possible frequency bands between 1-300 GHz including, for example, 1 GHz and 300 GHz, including L Band (1-2 GHz), C-Band (4-8 GHz), X-Band (8-12 GHz), Ku-Band (12-18 GHz), Ka-Band (26.5-40 GHz), S-Band (2-4 GHz), and V-Band (40-75 GHz).

In various examples, end points 630 may correspond to portable mobile devices, internet of things (IoT) devices, desktop computers, user terminals, or any of a number of devices with communication capabilities. Alternatively, end points 630 may correspond to networks such as mobile towers, mining sites, ships, planes, or the like. In one example, end point 630A may correspond to a service and end point 630B may correspond to a consumer. It should be understood that the satellite communication environment may comprise other end points 610 and/or other arrangements of components than those illustrated. Furthermore, multiple communication paths may be constructed and operated in parallel, and separate communication paths may have different arrangements from each other.

End point 630A may be communicatively connected via a terrestrial network 636 (e.g., comprising the Internet, a private telecom backbone, or a cloud compute center) to a gateway 638. Gateway 638 may include one or more switches (not shown) to facilitate communication between the various components, such as a first switch at the boundary between terrestrial network 636 and a gateway compute infrastructure 660, and a second switch at the boundary between gateway compute infrastructure 660 and a gateway feed infrastructure 658. Such switches may be physical or virtual Gigabit Ethernet (GigE) switches. However, it should be understood that the above-described first and second switches could be implemented in the same switch. In some examples, the first switch may implement transport from terrestrial network 636 to a VNF 654 within a gateway service chain 656. In such a case, VNF 654 may act as a User Network Interface (UNI) or an External Network-Network Interface (ENNI) as defined by the applicable MEF Ethernet services and MEF operator services standards. Alternatively, the first switch may itself represent the UNI as defined by the applicable MEF standards.

Gateway compute infrastructure 660 may include a set of computing devices 634 situated onsite (at a same physical location) or offsite (at a different physical location) relative to antenna 650. In some examples, computing devices 634 may comprise general-purpose computers or servers capable of running VNFs 654 and other virtualization software such as hypervisors to support gateway service chain 656. In some examples, computing devices 634 may employ x86 architectures, ARM architectures, RISC-V architectures, among other possibilities. Computing devices 634 may be configured as clusters, data centers, warehouse-scale computers, among other possibilities. Gateway compute infrastructure 660 may further include suitable storage systems that provide persistent and reliable storage in support of VNFs 654.

In some examples, gateway compute infrastructure 660 may include a managing system that instantiates and configures one or more VNFs 654 to form gateway service chain 656. Two sets of one or more VNFs 654 may provide two-way communication, including a transmission path and a reception path, between terrestrial network 636 and a gateway feed infrastructure 658 of gateway 656. It should be understood that in an example in which gateway service chain 656 provides only one-way communication, VNFs 654 may provide only a transmission path without providing a reception path. The set of VNFs 654 (e.g., implementing a gateway) on the forward path towards the link to satellite 620, may comprise or constitute a traffic handler, an encapsulator (e.g., implementing generic stream encapsulation (GSE)), a modulator (e.g., the OpenSpace™ Wideband Software modulator, offered by Kratos Defense & Security Solutions, Inc. of San Diego, California), a combiner, an encryption/decryption VNF, a time division multiple access (TDMA) resource allocator, an antenna controller, among other possibilities.

This set of VNFs 654 on the transmission path may convert protocol data units (PDUs) into a digital signal (such as a digital intermediate frequency (IF) waveform or a composite digital IF waveform). For example, the traffic handler may process data link layer (e.g., Layer 2 or L2 in the Open Systems Interconnection (OSI) model) and/or network layer (e.g., Layer 3 or L3 in the OSI model) traffic, and provide the processed Ethernet frames or IP packets to the encapsulator. The encapsulator may convert the PDUs into baseband frames, and provide the baseband frames to the modulator. A baseband frame may be the basic unit of transmission in satellite communication system 600. The encapsulator may form baseband frames in accordance with the 5G standard, the DVB-S2x standard, described in European Telecommunications Standards Institute (ETSI) European Standard (EN) 302 307-1 v1.4.1 (2014 November), among other possible standards. The encapsulator may comprise one or more VNFs 654 (or software subprocesses) that perform one or more of the following functions: frame chopping, forward modulation selection (e.g., with Adaptive Coding and Modulation (ACM)), Ethernet bridge (e.g., Media Access Control (MAC) table, smart bridging/learning/relay, etc.), Address Resolution Protocol (ARP) (e.g., Ethernet MAC discovery), VLAN manipulation (e.g., to rewrite Ethernet frames on ingress/egress based on the MEF service definition), header compression (e.g., Robust Header Compression (ROHC)); and/or OTA optimization (e.g., Space Communications Protocol Specifications (SCPS)/ TCP-Acceleration). The modulator may convert the baseband frames into signal data packets in accordance with a particular standard, including the standards of the Digital Intermediate Frequency Interoperability (DIFI) Consortium in the DIFI/Institute of Electrical and Electronics Engineers (IEEE) 1.0 specification, the VMEbus International Trade Association (VITA) standard, the enhanced Common Public Radio Interface (eCPRI) standard, among other possibilities. In an embodiment, the encapsulator and the traffic handler may be implemented as a single VNF 654, referred to as a virtualized traffic adaptor (vModem). The VNF-implemented combiner or a combiner 642 (implemented in hardware) may combine the signal data packets into a digital signal and provide the digital signal to a digitizer 640A, which may convert the digital signal into an analog signal.

The set of VNFs 654 on the return path may comprise or constitute, in order, a digital channelizer (e.g., the OpenSpace™ Wideband Channelizer, offered by Kratos Defense & Security Solutions, Inc. of San Diego, California), a demodulator (e.g., the OpenSpace™ Wideband Software Receiver, offered by Kratos Defense & Security Solutions, Inc. of San Diego, California), and a decapsulator. This set of VNFs 654 on the reception path may convert a digital signal (such as a digital IF waveform or a composite digital IF waveform) to PDUs, which may be Ethernet frames or IP packets, among other possibilities. For example, the VNF-implemented channelizer or a channelizer 644 (implemented in hardware) may receive a digital signal from digitizer 640A, which has converted an analog signal into the digital signal, and divide the digital signal into signal data packets. The demodulator may convert the signal data packets to baseband frames, and provide the baseband frames to the decapsulator. The decapsulator may convert the baseband frames into PDUs, which may be transmitted, via terrestrial network 636, to end point 630A. It should be understood that the demodulator performs the reverse function(s) of the modulator, and the decapsulator performs the reverse function(s) of the encapsulator. In an embodiment, the decapsulator and demodulator may be implemented as a single VNF 654, for example, together with the traffic handler, encapsulator, and modulator, in a vModem. In other words, a vModem may consist of a single VNF 654 that implements all of the functions of the traffic handler, encapsulator/decapsulator, and modulator/demodulator.

In some embodiments, in which gateway service chain 656 implements a vModem, the vModem may comprise one or more modulators that are configured to modulate waveforms according to a digital satellite broadcast standard and/or one or more demodulators that are configured to demodulate waveforms according to a digital satellite broadcast standard. Such a vModem may provide carrier ethernet (CE) services, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames. The digital satellite broadcast standard may be a digital satellite television broadcast standard, such as the DVB-S2x standard managed by the Digital Video Broadcasting (DVB) Project. While a digital satellite broadcast standard, such as a DVB standard, is used as an example, the vModem may be configured to modulate and demodulate waveforms according to other standards for wideband digital communication, such as orthogonal frequency-division multiplexing (OFDM), or the like.

The digital signal from combiner 642 is transmitted to digitizer 640A, which converts the digital signal output by combiner 642 into an analog transmission signal for communication to satellite 620. Digitizer 640A further digitizes analog reception signals from satellite 620 into digital signals for use by channelizer 644. In some examples, digitizer 640A may be software-defined. As one example, digitizer 640A may be a SpectralNet™, which is a carrier-grade RF digitizer, offered by Kratos Defense & Security Solutions, Inc. of San Diego, California. Digitizer 640A communicates with antenna 650A. In particular, digitizer 640A provides the transmission signal to antenna 650A, which transmits the transmission signal to satellite 620. In addition, in two-way communications, antenna 650A receives a reception signal from satellite 620, and provides the reception signal to digitizer 640A.

In various examples, antenna 650A may be a parabolic reflector antenna, a flat panel antenna, a phased array antenna, a helical antenna, a patch antenna, a horn antenna, among other possibilities. In some examples, antenna 650A may be an electronically steered antenna that can use electronic means to control the direction and shape of its radiation pattern. Such an antenna can generate multiple beams simultaneously, allowing it to transmit or receive signals in multiple directions at the same time. Antenna 650A may include both the physical antenna as well as the corresponding radio frequency (RF) subsystem, which may include a combination of diplexers, amplifiers (e.g., low noise amplifiers (LNAs)), upconverters, and downconverters (e.g., low-noise block downconverters (LNBs)) depending on the specific frequency band and application.

Satellite 620 relays wireless signals from antenna 650A to antenna 650B. In two-way communications, satellite 620 also relays wireless signals from antenna 650B to antenna 650A. Antenna 650B may be functionally similar or identical to antenna 650A, and therefore, any description of antenna 650A applies equally to antenna 650B, which may not be redundantly described herein. Similarly, digitizer 640B may be functionally similar or identical to digitizer 640A, and therefore, any description of digitizer 640A applies equally to digitizer 640B, which may not be redundantly described herein.

Digitizer 640B may communicate directly with a terminal service chain 657 of a terminal compute infrastructure. Terminal service chain 657 may comprise a set of VNF(s) 655 forming a reception path from digitizer 640B to end point 630B. In two-way communications, terminal service chain 657 may also comprise a set of VNFs 655 forming a transmission path from end point 630B to digitizer 640B. The reception and transmission paths may be identical or similar to the reception and transmission paths described with respect to gateway service chain 656. For example, the reception path may comprise a demodulator followed by a decapsulator to convert signal frames into PDUs, and the transmission path may comprise an encapsulator followed by a modulator to convert PDUs into signal frames. The traffic handler, encapsulator, decapsulator, modulator, and demodulator may all be similar or identical to those described with respect to gateway service chain 656, and therefore, the descriptions of those components with respect to gateway service chain 656 apply equally to those components in terminal service chain 657.

Terminal service chain 657 may communicate with end point 630B. For example, the traffic handler of terminal service chain 657 may transmit Ethernet frames to end point 630B. In addition, in two-way communications, the encapsulator of terminal service chain 657 may receive PDUs from end point 630B. Thus, the combination of gateway service chain 656 and terminal service chain 657 enable one-way or two-way communications between end points 610A and 610B over a satellite link.

Gateway service chain 656 and terminal service chain 657 may comprise one or more of the software-defined components (e.g., VNFs and/or digitizers) described in International Patent App. Nos. PCT/US2021/033867, filed on May 24, 2021, PCT/US2021/033875, filed on May 24, 2021, PCT/US2021/033905, filed on May 24, 2021, and PCT/US2021/062689, filed on Dec. 9, 2021, which are all hereby incorporated herein by reference as if set forth in full.

Advantageously, the utilization of VNFs and software-defined components (e.g., digitizers 640A and 640B) to perform various functions, aid in automation and scalability. Embodiments may minimize the presence of physical hardware components, such that satellite communication system 600 can be dynamically reconfigured (e.g., added, updated, destroyed, increased or decreased in dimension, etc.) in real time, primarily using in-band network communications, to adapt to the unique multivariate satcom environment (e.g., changing traffic patterns, RF interference, atmospheric characteristics, antenna conditions, path length, etc.).

Notably, dynamic reconfiguration of VNFs in a cloud computing environment can be used, not only to increase the dimensions of the computing resources (e.g., number of vCPUs, amount of memory and/or disk storage, network throughput, etc.) used for satellite communication system 600 on demand to ensure the sufficiency of the satellite communication system, but also to decrease the dimensions of the computing resources on demand to optimize the utilization of the hardware. For example, favorable changes in the satcom environment may improve performance of satellite communication system 600, such that satellite communication system 600 is providing significantly better performance than is required by the service level agreement. In this case, the management system may determine that gateway service chain 656 and terminal service chain 657 are insufficient, and update the service chains to reduce the resources used in the service chains (e.g., by reducing RF bandwidth usage, resizing one or more VNFs, swapping to a service chain with reduced dimensions, etc.). This is in contrast to conventional hardware-based service chains in which unused resources would simply be idled or otherwise ignored, representing a sunk cost that cannot be recouped.

Figure 7:
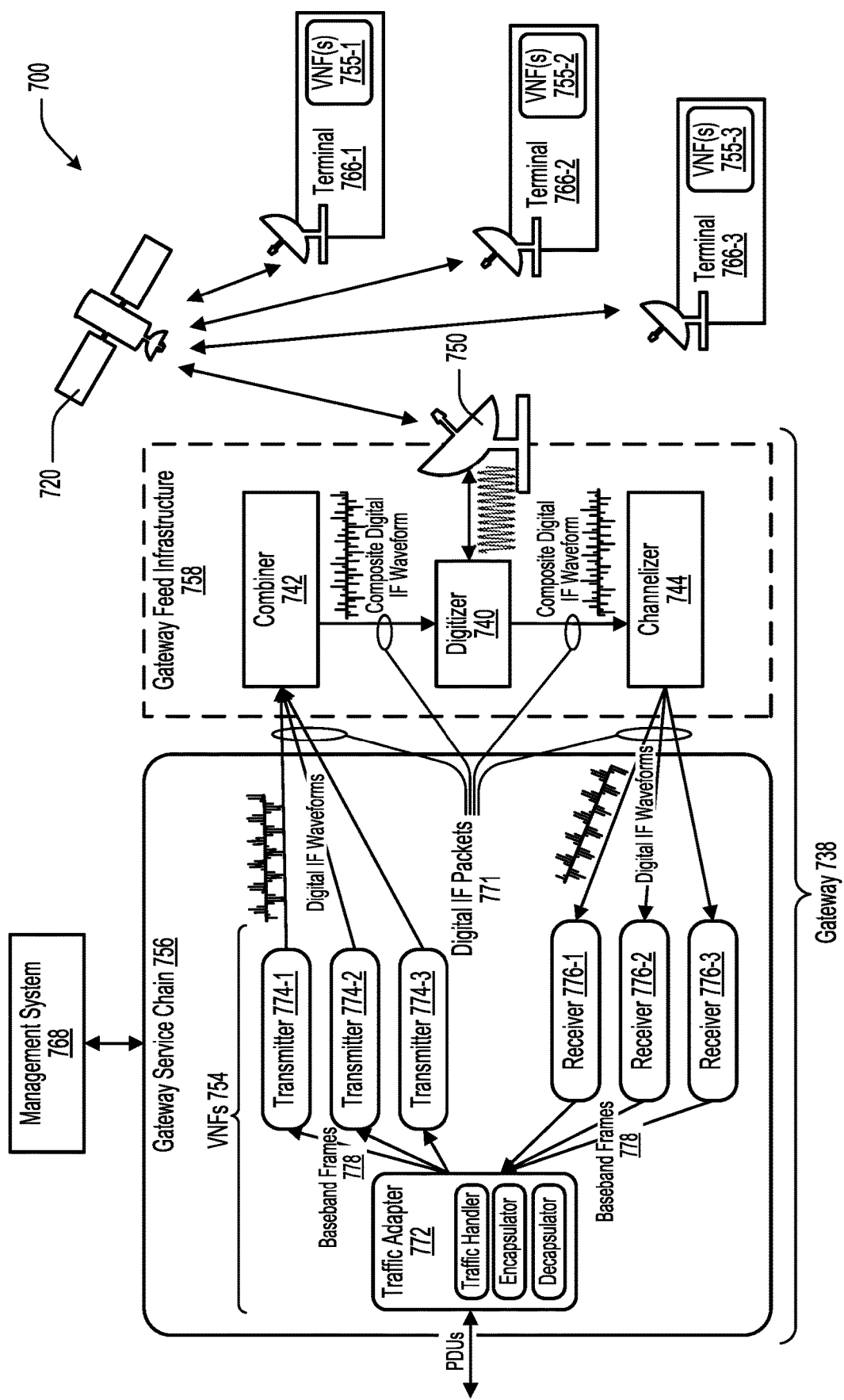
FIG. 7 illustrates an example satellite communication system including a gateway and a set of terminals.

FIG. 7 illustrates an example satellite communication system 700 including a gateway 738 and a set of terminals 766 (or "remote terminals"), in accordance with some embodiments of the present disclosure. In the illustrated example, satellite communication system 700 includes a gateway 738 (or "hub") in communication with each of terminals 766 via a satellite 720. Gateway 738 may include a gateway feed infrastructure 758 that serves as an onsite infrastructure (close to antenna 750, e.g., at a same physical location) that may perform primarily signal digitization and signal routing-related tasks and a gateway compute infrastructure that can be onsite or offsite infrastructure (far from antenna 750, e.g., at a different physical location) that supports a gateway service chain 756 that performs primarily signal processing and packet processing-related tasks. The gateway compute infrastructure may include one or more computers, clusters, a data center, or a warehouse-scale computer. The computing devices comprising the gateway compute infrastructure and/or gateway feed infrastructure 758 may include general-purpose computers or servers employing x86 architectures, ARM architectures, RISC-V architectures, among other possibilities.

Gateway 738 may include a gateway service chain 756 comprising a set of VNFs 754 running on the gateway compute infrastructure. Example VNFs include one or more traffic adapters 772, one or more virtual transmitters 774, one or more virtual receivers 776, among other possibilities. Each of VNFs 754 may be instantiated and configured by a management system 768 that scales up or down the number of active VNFs based on the number of active terminals 766. Management system 768 may further configure VNFs 754 such that satellite communication system 700 implements any one of a number of network topologies, including a single channel per carrier (SCPC) network, a TDMA network, a frequency division multiple access (FDMA) network, a mesh network, among other possibilities.

VNFs 754 may include one or more virtual transmitters 774 that provide one or more transmission paths between a terrestrial network and a gateway feed infrastructure 758 of gateway 756. Each of the set of virtual transmitters 774 on a transmission path may comprise or constitute a modulator (e.g., the OpenSpace™ Wideband Software modulator) that converts incoming baseband frames 778 into digital IF packets 771 containing digital waveforms at IF or RF frequencies (or "digital IF waveforms"). Traffic adapter 772 acts as the bridge between the terrestrial network and the satellite network. In some examples, traffic adapter 772 may include a traffic handler that processes data link layer (e.g., Layer 2 in the OSI model) and/or network layer (e.g., Layer 3 in the OSI model) traffic and provides the processed PDUs to the encapsulator, which convert the PDUs into baseband frames 778 and provides baseband frames 778 to one of virtual transmitters 774. Each of virtual transmitters 774 may implement a modulator that converts baseband frames 778 into digital IF packets 771 (e.g., according to the standards of the DIFI Consortium in the DIFI/IEEE 1.2 specification) to create the digital IF waveforms.

Digital IF packets 771 generated by virtual transmitters 774 may be fed into a combiner 742 that combines the multiple digital IF waveforms into a single composite signal (or "composite digital IF waveform"). Digital IF packets 771 containing the composite digital IF waveform is fed into a digitizer 740 that converts the digital signal into an analog signal in preparation for wireless transmission via an antenna 750. While combiner 742 is illustrated in FIG. 7 as being an element of gateway feed infrastructure 758, it is to be understood that a combiner VNF (or multiple combiner VNFs) may be instantiated by management system 768 to perform similar functionality.

On the reception path, digitizer 740 digitizes analog signals received from satellite 720 to generate digital IF packets 771 containing digital IF waveforms (e.g., a composite digital IF waveform) of the received analog signals for use by a channelizer 744. The composite digital IF waveform received by channelizer 744 may be a wide-band spectrum (e.g., 100 MHz, 500 MHz, 300 GHz, etc.) that may contain several signals within that segment of the frequency band. In some instances, channelizer 744 divides the composite digital IF waveform into separate digital IF waveforms and sends the waveforms (in the form of digital IF packets 771) to appropriate virtual receivers 776. While channelizer 744 is illustrated in FIG. 7 as being an element of gateway feed infrastructure 758, it is to be understood that a channelizer VNF (or multiple channelizer VNFs) may be instantiated by management system 768 to perform similar functionality. VNFs 754 may include one or more virtual receivers 776 that provide one or more reception paths between gateway feed infrastructure 758 and a terrestrial network. Each of the set of virtual receivers 776 on a reception path may comprise or constitute a demodulator (e.g., the OpenSpace™ Wideband Software Receiver) that converts incoming digital IF packets 771 containing digital IF waveforms into baseband frames 778. In some examples, baseband frames 778 produced by virtual receivers are sent to the decapsulator of traffic adapter 772. The decapsulator may convert baseband frames 778 into Ethernet frames and pass the Ethernet frames to the traffic handler, which processes and provides the Ethernet frames to a terrestrial network.

Satellite 720 relays wireless signals from antenna 750 to the antennas of terminals 766, or vice versa. In two-way communications, satellite 720 also relays wireless signals from the antennas of terminals 766 to antenna 750. In some examples, each of terminals 766 may include hardware infrastructure to support one or more VNFs 755. In some examples, VNFs 755 at each of terminals 766 may implement a vModem that comprises one or more modulators that are configured to modulate waveforms according to a digital satellite broadcast standard and/or one or more demodulators that are configured to demodulate waveforms according to the digital satellite broadcast standard. Such a vModem may provide CE services, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames, together with a traffic handler that connects the encapsulators and decapsulators with the terrestrial networks connected to terminals 766.

Figure 8:
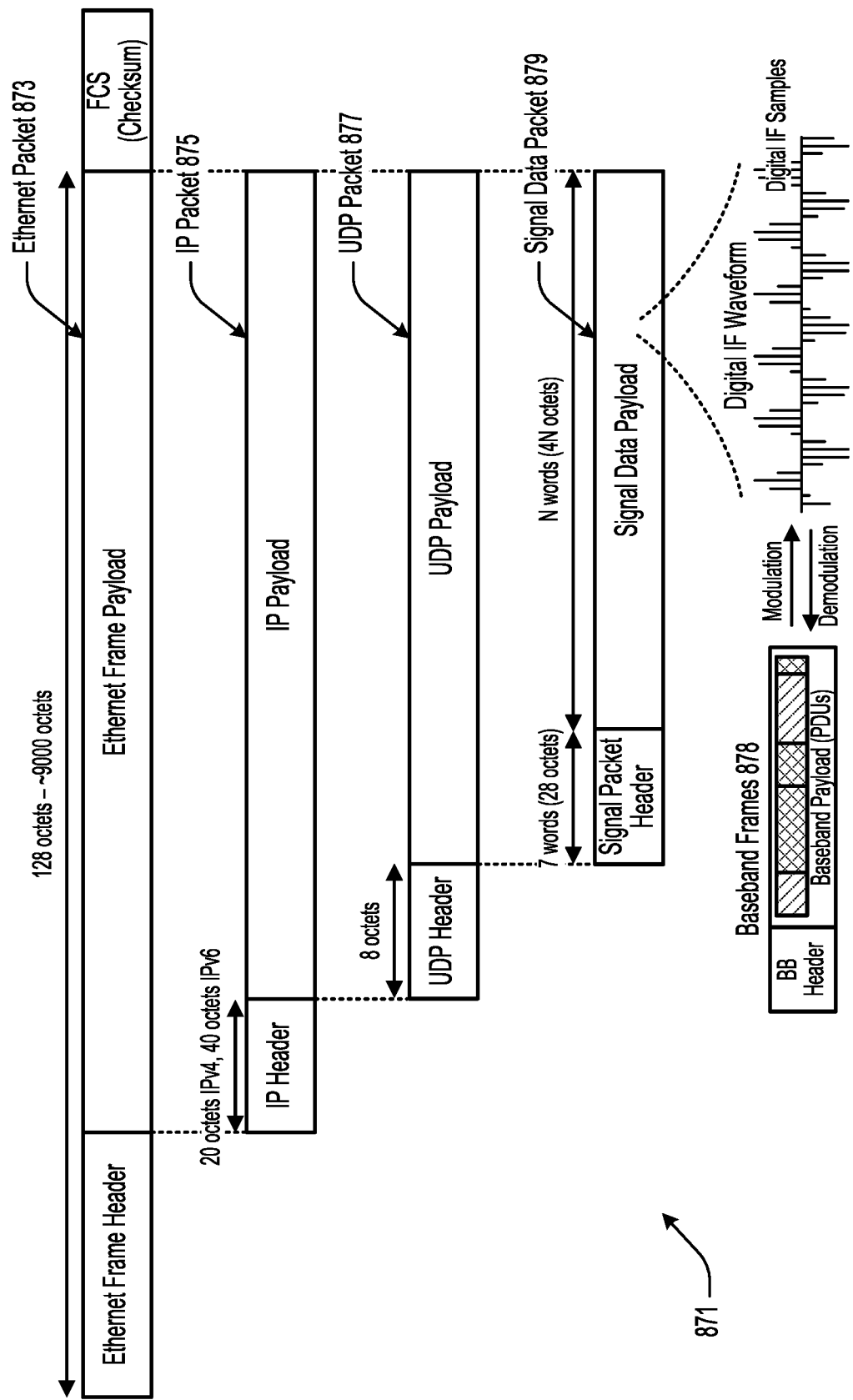
FIG. 8 illustrates an example digital IF packet with multiple protocol layers.

FIG. 8 illustrates an example digital IF packet 871 with multiple protocol layers, in accordance with some embodiments of the present disclosure. In the illustrated example, digital IF packet 871 includes a digital IF waveform contained within the signal data payload of a signal data packet 879. The digital IF waveform may represent the modulated form of one or more baseband frames 878 (or portions of one or more baseband frames 878), such that the baseband frames may be recovered by demodulating the digital IF waveform contained within the signal data payload. Signal data packet 879 may also include a signal packet header, which may implement the VITA standard (e.g., VITA 49.2 specification) or another standard.

In some examples, signal data packet 879 is encapsulated within a UDP packet 877 having a UDP header and UDP payload. UDP packet 877 may be encapsulated within an IP packet 875 having an IP header and IP payload, which may be encapsulated within an Ethernet packet 873 having an Ethernet frame header and Ethernet frame payload. In some examples, the total Ethernet packet size varies based on the number and size of the data samples in the signal data payload of signal data packet 879. There may be a fixed overhead within the Ethernet frame which comprises the IP header (20 octets for IPv4 or 40 octets (minimum) for IPv6), the UDP header (8 octets), the signal packet header (28 octets). In some examples, the Ethernet frame payload is adjustable from 128 octets to approximately 9000 octets.

In some examples, digital IF packet 871 may include different packet classes for signal data packet 879. In a first packet class, signal data packet 879 may be a regular data packet that includes the data for the digital samples forming the digital IF waveform. In a second packet class, signal data packet 879 may be a context packet that includes data to ensure standardization of the transport of metadata describing the sampled signal data. Such data may include the IF reference frequency, the sample rate, the bit depth, the equivalent analog bandwidth of the signal represented by the digital stream, the frequency offset of the center of the band occupied by the signal from the IF reference frequency, among other possibilities. In a third packet class, signal data packet 879 may be a command packet that includes data used to provide and acknowledge device settings and support control of timing to permit synchronization of upstream or downstream devices.

FIGS. 9A-9C illustrate example traffic adapters 972 implementing different network types, in accordance with some embodiments of the present disclosure. In FIG. 9A, traffic adapter 972 is configured by the management system to implement a SCPC (single tenant) network connection type. The encapsulator processes incoming PDUs destined for a terminal 966-1 by encapsulating the PDUs into a baseband frame 978 and adding an encapsulation header to each PDU and a baseband header to the entire baseband frame 978. The encapsulation headers (based on ETSI TS 102 606) include an identifier for terminal 966-1, an identifier of the encapsulated PDU's type, and an indicator of the length of the PDU. They may further include information to allow splitting an encapsulated PDU into multiple fragments to be distributed over multiple baseband frames 978. The baseband header includes, among other elements, information about the contained encapsulation structure and the total size of the payload. Upon receiving baseband frame 978, a traffic adapter of terminal 966-1 may decapsulate the baseband frame to recover the PDUs.

In FIG. 9B, traffic adapter 972 is configured by the management system to implement a SCPC (multiple tenant) network connection type. The encapsulator processes a first set of PDUs destined for Tenant 1 via terminal 966-1 and a second set of PDUs destined for Tenant 2 via terminal 966-1 by encapsulating both sets of PDUs (received within a particular time window) into a single baseband frame 978 and adding a baseband header to baseband frame 978 and individual encapsulation headers to each PDU. The encapsulation headers may include an identifier for Tenant 1, an identifier for Tenant 2, an indicator of the encapsulated PDU's content, an indicator of the size of the encapsulated PDU, and information about fragmentation of the encapsulated PDU across multiple baseband frames 978, among other possibilities. The baseband header includes, among other elements, information about the contained encapsulation structure and the total size of the payload. Upon receiving baseband frame 978, the traffic adapter of terminal 966-1 may decapsulate baseband frame 978 to recover and separate the PDUs, and may route the PDUstoward Tenant 1 and Tenant 2 as appropriate.

In FIG. 9C, traffic adapter 972 is configured by the management system to implement an FDMA or TDMA network connection type. The encapsulator processes a first set of PDUs destined for terminal 966-1 and a second set of PDUs destined for terminal 966-2 by encapsulating both sets of PDUs (received within a particular time window) into a single baseband frame 978 and adding a baseband header to baseband frame 978 and individual encapsulation headers to each PDU. The encapsulation headers include an identifier for terminal 366-1, an identifier for terminal 366-2, an indicator of the encapsulated PDU's content, an indicator of the size of the encapsulated PDU, and information about fragmentation of the encapsulated PDU across multiple baseband frames 978, among other possibilities. They may further include information to allow splitting an encapsulated PDU into multiple fragments to be distributed over multiple baseband frames 978. The baseband header includes, among other elements, information about the contained encapsulation structure and the total size of the payload. Upon receiving baseband frame 978, the traffic adapter of terminal 966-1 may decapsulate baseband frame 978 to recover the PDUs destined for terminal 966-1, and the traffic adapter of terminal 966-2 may decapsulate baseband frame 978 to recover the PDUs destined for terminal 966-2.

Figure 10:
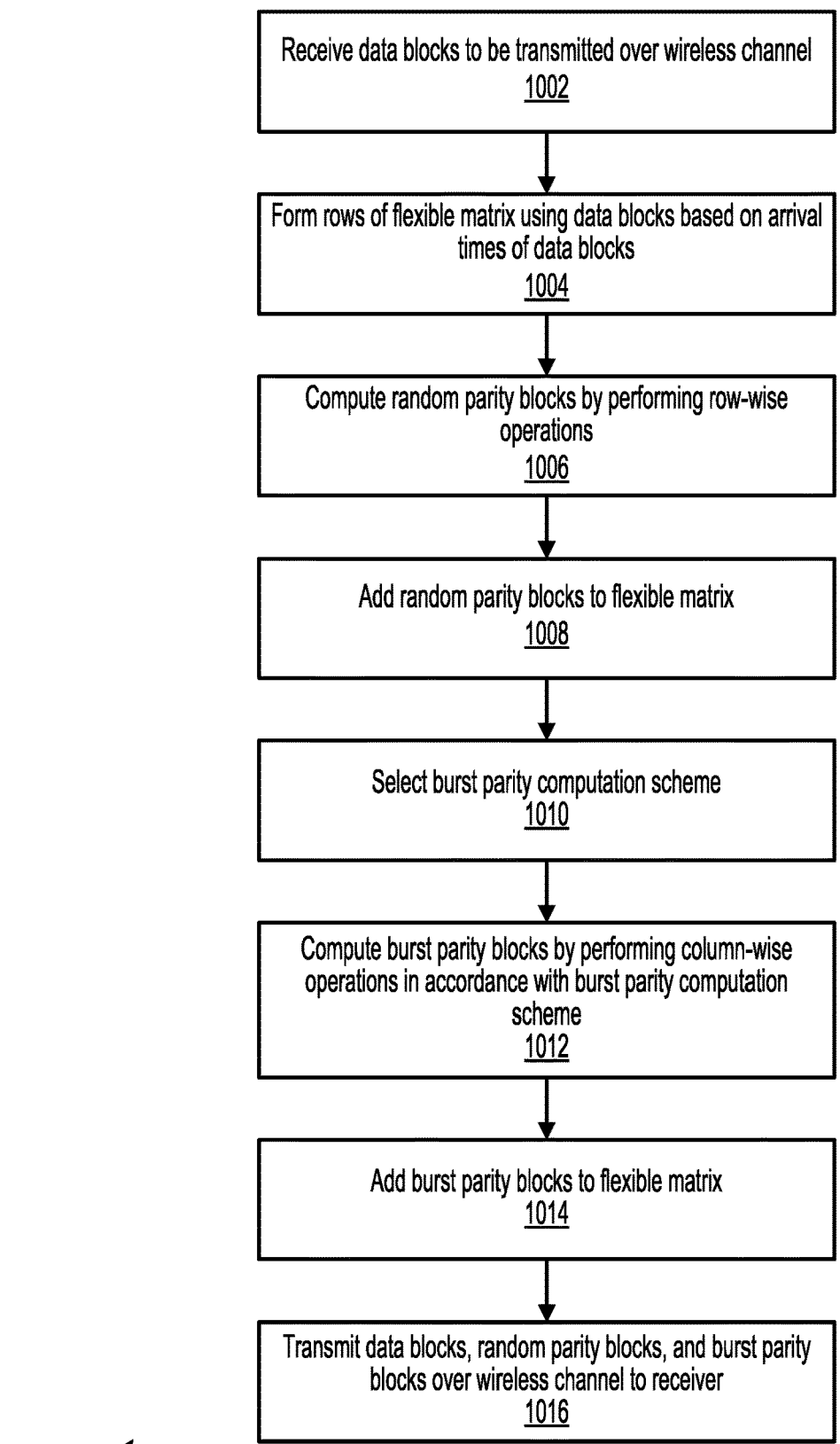
FIG. 10 illustrates an example method of performing forward error correction using a flexible matrix.

FIG. 10 illustrates an example method 1000 of performing FEC in a communication system (e.g., communications systems 100, 600, 700), in accordance with some embodiments of the present disclosure. Steps of method 1000 may be performed in any order and/or in parallel, and one or more steps of method 1000 may be optionally performed. One or more steps of method 1000 may be performed by one or more processors. Method 1000 may be implemented as a computer-readable medium or computer program product comprising instructions which, when the program is executed by one or more processors, cause the one or more processors to carry out the steps of method 1000.

At step 1002, a set of data blocks (e.g., data blocks 214, 314, 414, 514) to be transmitted over a wireless channel are received. The wireless channel may be a satellite communication channel. The set of data blocks may include user data received over a terrestrial network (e.g., terrestrial network 636). The set of data blocks may be received at a channel encoder (e.g., channel encoder 122). The channel encoder may be a VNF (e.g., VNFs 654, 655, 754, 755) running on a compute infrastructure (e.g., compute infrastructures 160, 660). The compute infrastructure may be part of a gateway (e.g., gateways 638, 738) or a terminal (e.g., terminals 666, 766, 966). Each of the set of data blocks may represent the payload of a data packet, such as an Ethernet packet, an IP packet, a UDP packet, or a signal data packet.

At step 1004, rows of a flexible matrix (e.g., flexible matrix 212) are formed using the set of data blocks based on arrival times of the set of data blocks. Each of the rows may correspond to a different time window having a same window duration. The window duration and a burst period for the flexible matrix may be selected based on a characterization of random and burst losses experienced by the communication system. The characterization of random and burst losses may include an estimated or measured frequency of random losses experienced by the communication system and/or an estimated or measured frequency and duration of burst losses experienced by the communication system.

At step 1006, a set of random parity blocks (e.g., random parity blocks 216, 416, 516) are computed by performing row-wise parity operations on the flexible matrix. Each of the set of random parity blocks may be computed based on a random parity group comprising a subset of the set of the data blocks from one or more of the rows of the flexible matrix. The random parity group for each of the set of random parity blocks may comprise N of the data blocks.

At step 1008, the set of random parity blocks are added to the flexible matrix. Adding the set of random parity blocks to the flexible matrix may cause new rows and/or columns to be added to the flexible matrix.

At step 1010, a burst parity computation scheme is selected from a set of burst parity computation schemes including a first burst parity computation scheme and a second burst parity computation scheme. The burst parity computation scheme may be selected based on the characterization of random and burst losses experienced by the communication system.

At step 1012, a set of burst parity blocks (e.g., burst parity blocks 218) are computed by performing column-wise parity operations on the flexible matrix in accordance with the burst parity computation scheme. In the first burst parity computation scheme, the set of burst parity blocks may be computed by performing column-wise parity operations independent of the set of random parity blocks. In the second burst parity computation scheme, the set of burst parity blocks may be computed by performing column-wise parity operations based on the set of random parity blocks.

At step 1014, the set of burst parity blocks are added to the flexible matrix. Adding the set of burst parity blocks to the flexible matrix may cause a new row to be added to the flexible matrix. For example, the set of burst parity blocks may be added to a last row of the flexible matrix.

At step 1016, the set of data blocks, the set of random parity blocks, and the set of burst parity blocks are transmitted over the wireless channel to a receiver. Method 1000 may further include steps for receiving the transmitted blocks at the receiver, identifying one or more blocks to be corrected, and correcting the one or more blocks by performing parity operations using the set of data blocks, the set of random parity blocks, and the set of burst parity blocks. The transmitted blocks may be received at a channel decoder (e.g., channel decoder 124). The channel decoder may be a VNF running on a compute infrastructure that may be part of a gateway or a terminal.

Figure 11:
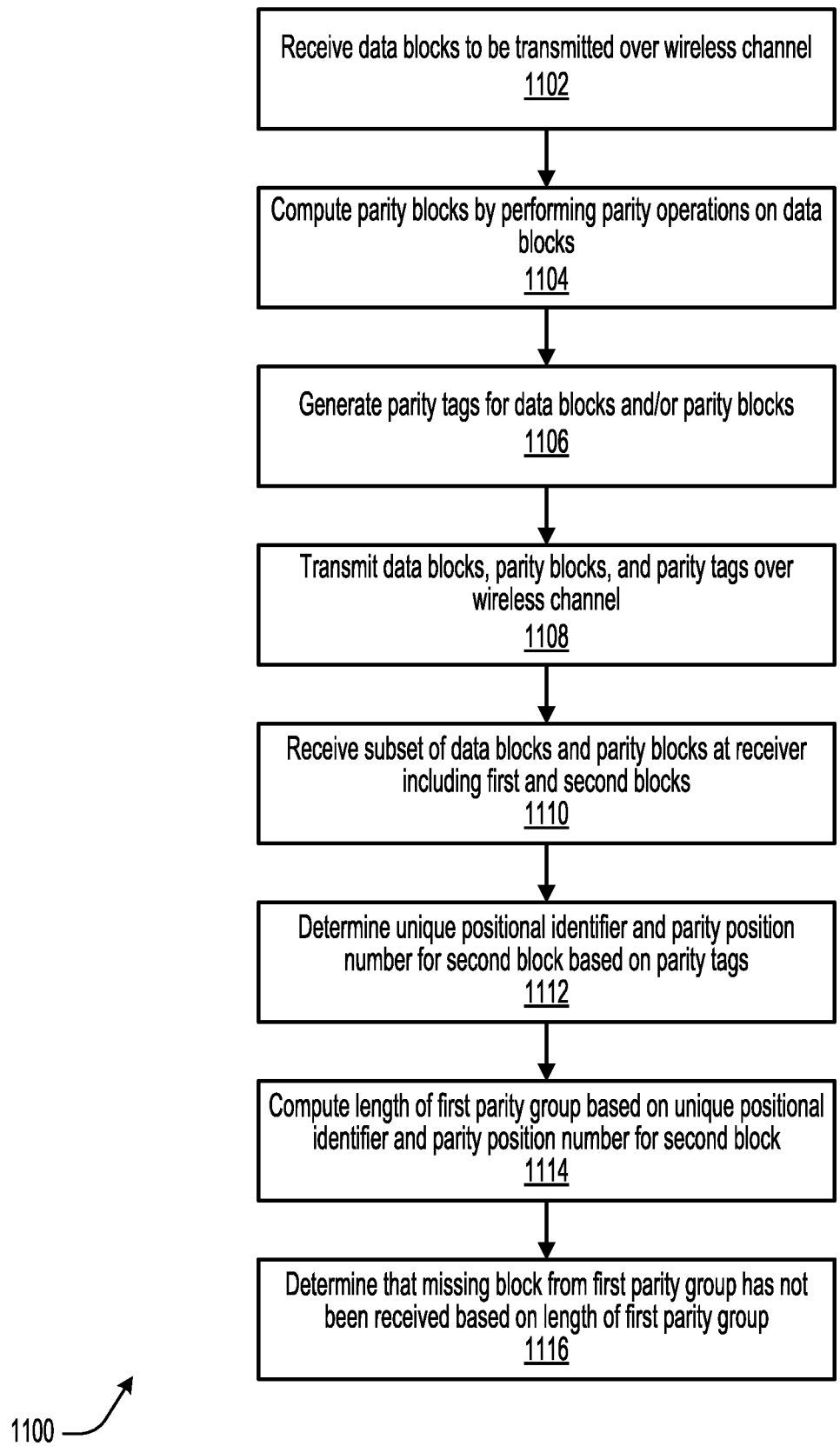
FIG. 11 illustrates an example method of performing FEC with non-deterministic parity group lengths.

FIG. 11 illustrates an example method 1100 of performing FEC in a communication system (e.g., communications systems 100, 600, 700), in accordance with some embodiments of the present disclosure. Steps of method 1100 may be performed in any order and/or in parallel, and one or more steps of method 1100 may be optionally performed. One or more steps of method 1100 may be performed by one or more processors. Method 1100 may be implemented as a computer-readable medium or computer program product comprising instructions which, when the program is executed by one or more processors, cause the one or more processors to carry out the steps of method 1100.

At step 1102, a set of data blocks (e.g., data blocks 214, 314, 414, 514) to be transmitted over a wireless channel are received. The wireless channel may be a satellite communication channel. The set of data blocks may include user data received over a terrestrial network (e.g., terrestrial network 636). The set of data blocks may be received at a channel encoder (e.g., channel encoder 122). The channel encoder may be a VNF (e.g., VNFs 654, 655, 754, 755) running on a compute infrastructure (e.g., compute infrastructures 160, 660). The compute infrastructure may be part of a gateway (e.g., gateways 638, 738) or a terminal (e.g., terminals 666, 766, 966). Each of the set of data blocks may represent the payload of a data packet, such as an Ethernet packet, an IP packet, a UDP packet, or a signal data packet.

At step 1104, a set of parity blocks (e.g., random parity blocks 216, 416, 516) are generated by performing parity operations on a set of data blocks. The set of data blocks may be divided into a set of parity groups (e.g., parity groups 528) such that each of the set of data blocks belongs to one of the set of parity groups. The set of parity groups may include a first parity group and a second parity group.

At step 1106, a set of parity tags (e.g., parity tags 332, 432, 532) are generated for the set of data blocks and/or the set of parity blocks. Each of the set of parity tags may include a unique positional identifier (e.g., unique positional identifier 336) and a parity position number (e.g., parity position number 346) for a respective one of the set of data blocks or the set of parity blocks. In some examples, each of the set of parity tags may further include a parity group number (e.g., parity group number 328) for the respective one of the set of data blocks or the set of parity blocks. The parity group number may identify one of the set of parity groups.

At step 1108, the set of data blocks, the set of parity blocks, and the set of parity tags are transmitted over the wireless channel from a transmitter to a receiver. The set of data blocks, the set of parity blocks, and the set of parity tags may be transmitted in data packets. The set of data blocks and the set of parity blocks may be transmitted in packet payloads and the set of parity tags may be transmitted in packet headers. The data packets may be Ethernet packets, IP packets, UDP packets, or signal data packets.

At step 1110, a subset of the set of data blocks and the set of parity blocks are received at the receiver. The set of parity tags associated the subset may also be received at the receiver. The subset may include a first block from the first parity group and a second block from the second parity group. The second block may have been transmitted after the first block.

At step 1112, a unique positional identifier for the second block and a parity position number for the second block are determined based on a parity tag for the second block. Step 1112 may further include determining a unique positional identifier for the first block and a parity position number for the first block based on a parity tag for the first block.

At step 1114, a length of the first parity group is computed based on the unique positional identifier for the second block and the parity position number for the second block. The length of the first parity group may be computed further based on the unique positional identifier for the first block and the parity position number for the first block.

At step 1116, it is determined that a missing block from the first parity group has not been received based on the length of the first parity group. The missing block from the first parity group may be a parity block from the set of parity blocks, and method 1100 may further include recovering the parity block by performing parity operations on blocks from the first parity group. The missing block from the first parity group may be a data block from the set of data blocks, and method 1100 may further include recovering the data block by performing parity operations on blocks from the first parity group. In some examples, in response to determining that the missing block from the first parity group has not been received, method 1100 may further include introducing latency at the receiver to wait for the missing block.

Figure 12:
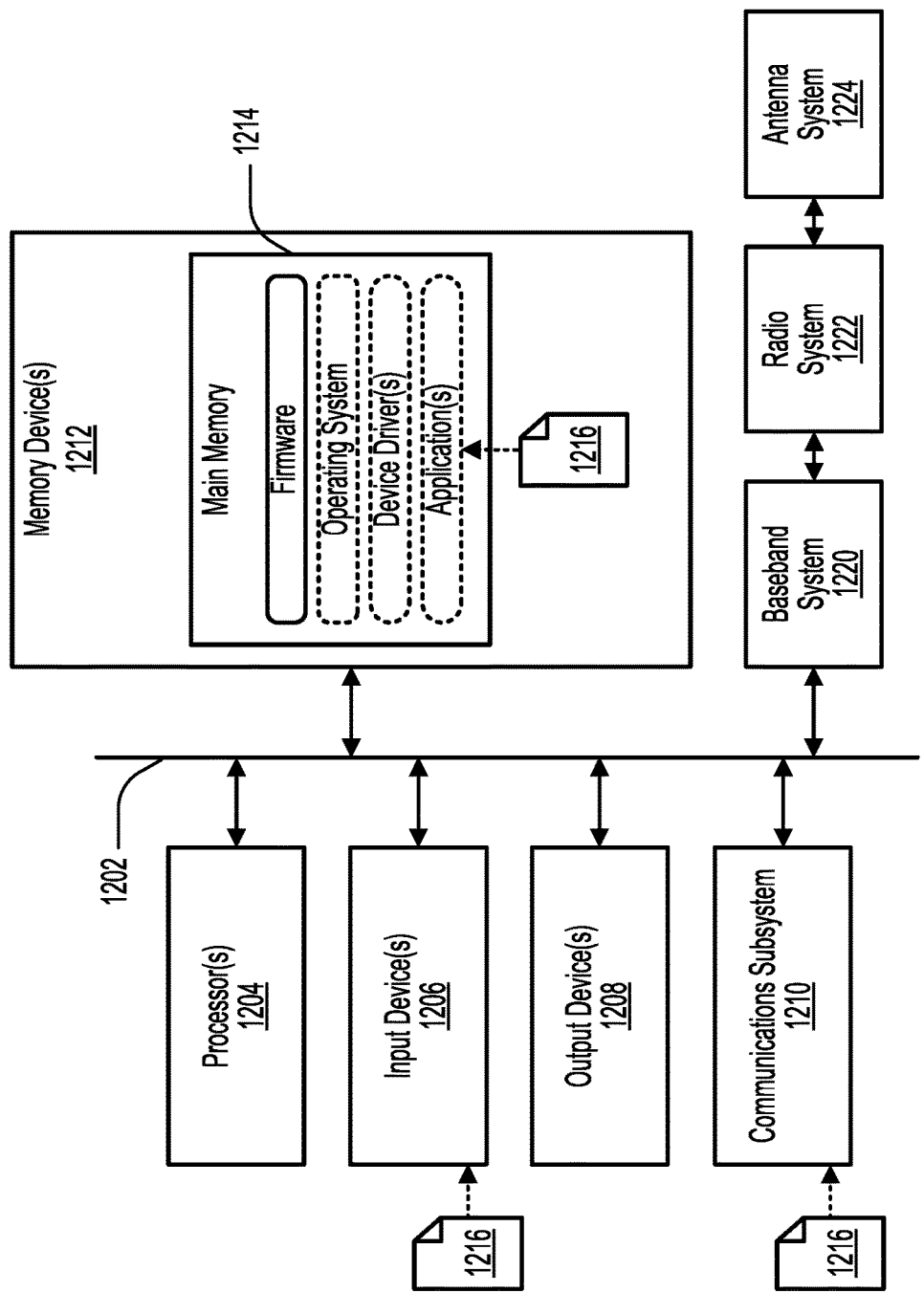
FIG. 12 illustrates an example computer system comprising various hardware elements.

FIG. 12 illustrates an example computer system 1200 comprising various hardware elements, in accordance with some embodiments of the present disclosure. Computer system 1200 may be incorporated into or integrated with devices described herein and/or may be configured to perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

In the illustrated example, computer system 1200 includes a communication medium 1202, one or more processor(s) 1204, one or more input device(s) 1206, one or more output device(s) 1208, a communications subsystem 1210, one or more memory device(s) 1212, a baseband system 1220, a radio system 1222, and an antenna system 1224. Computer system 1200 may be implemented using various hardware implementations and embedded system technologies. For example, one or more elements of computer system 1200 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 1200 may be communicatively coupled via communication medium 1202. While communication medium 1202 is illustrated as a single connection for purposes of clarity, it should be understood that communication medium 1202 may include various numbers and types of communication media for transferring data between hardware elements. For example, communication medium 1202 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1202 may include one or more buses that connect the pins of the hardware elements of computer system 1200. For example, communication medium 1202 may include a bus that connects processor(s) 1204 with main memory 1214, referred to as a system bus, and a bus that connects main memory 1214 with input device(s) 1206 or output device(s) 1208, referred to as an expansion bus. The system bus may itself consist of several buses, including an address bus, a data bus, and a control bus. The address bus may carry a memory address from processor(s) 1204 to the address bus circuitry associated with main memory 1214 in order for the data bus to access and carry the data contained at the memory address back to processor(s) 1204. The control bus may carry commands from processor(s) 1204 and return status signals from main memory 1214. Each bus may include multiple wires for carrying multiple bits of information and each bus may support serial or parallel transmission of data.

Processor(s) 1204 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1204 may include one or more multi-core processors, in which each core may read and execute program instructions concurrently with the other cores, increasing speed for programs that support multithreading.

Input device(s) 1206 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 1206 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1208 may include one or more of various devices that convert information into human-readable form, such as without limitation a display device, a speaker, a printer, a haptic or tactile device, and/or the like. Output device(s) 1208 may also include devices for writing to removable storage devices or other removable media, such as those described in reference to input device(s) 1206. Output device(s) 1208 may also include various actuators for causing physical movement of one or more components. Such actuators may be hydraulic, pneumatic, electric, and may be controlled using control signals generated by computer system 1200.

Communications subsystem 1210 may include hardware components for connecting computer system 1200 to systems or devices that are located external to computer system 1200, such as over a computer network. In various embodiments, communications subsystem 1210 may include a wired communication device coupled to one or more input/output ports (e.g., a universal asynchronous receiver-transmitter (UART)), an optical communication device (e.g., an optical modem)), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1212 may include the various data storage devices of computer system 1200. For example, memory device(s) 1212 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1204 and memory device(s) 1212 are illustrated as being separate elements, it should be understood that processor(s) 1204 may include varying levels of on-processor memory, such as processor registers and caches that may be utilized by a single processor or shared between multiple processors.

Memory device(s) 1212 may include main memory 1214, which may be directly accessible by processor(s) 1204 via the address and data buses of communication medium 1202. For example, processor(s) 1204 may continuously read and execute instructions stored in main memory 1214. As such, various software elements may be loaded into main memory 1214 to be read and executed by processor(s) 1204 as illustrated in FIG. 12. Typically, main memory 1214 is volatile memory, which loses all data when power is turned off and accordingly needs power to preserve stored data. Main memory 1214 may further include a small portion of non-volatile memory containing software (e.g., firmware, such as BIOS) that is used for reading other software stored in memory device(s) 1212 into main memory 1214. In some embodiments, the volatile memory of main memory 1214 is implemented as RAM, such as dynamic random-access memory (DRAM), and the non-volatile memory of main memory 1214 is implemented as read-only memory (ROM), such as flash memory, erasable programmable read-only memory (EPROM), or electrically erasable programmable read-only memory (EEPROM).

Computer system 1200 may include software elements, shown as being currently located within main memory 1214, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1216, which are executable by computer system 1200. In one example, such instructions 1216 may be received by computer system 1200 using communications subsystem 1210 (e.g., via a wireless or wired signal that carries instructions 1216), carried by communication medium 1202 to memory device(s) 1212, stored within memory device(s) 1212, read into main memory 1214, and executed by processor(s) 1204 to perform one or more steps of the described methods. In another example, instructions 1216 may be received by computer system 1200 using input device(s) 1206 (e.g., via a reader for removable media), carried by communication medium 1202 to memory device(s) 1212, stored within memory device(s) 1212, read into main memory 1214, and executed by processor(s) 1204 to perform one or more steps of the described methods.

Computer system 1200 may include optional wireless communication components that facilitate wireless communication over a voice network and/or a data network. The wireless communication components comprise an antenna system 1224, a radio system 1222, and a baseband system 1220. In computer system 1200, RF signals are transmitted and received over the air by antenna system 1224 under the management of radio system 1222. In an embodiment, antenna system 1224 may comprise one or more antennae and one or more multiplexors (not shown) that perform a switching function to provide antenna system 1224 with transmit and receive signal paths. In the reception path, received RF signals can be coupled from a multiplexor to a low noise amplifier (not shown) that amplifies the received RF signal and sends the amplified signal to radio system 1222. In an alternative embodiment, radio system 1222 may comprise one or more radios that are configured to communicate over various frequencies. In an embodiment, radio system 1222 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 1222 to baseband system 1220.

In some embodiments of the present disclosure, instructions 1216 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1200. For example, the non-transitory computer-readable medium may be one of memory device(s) 1212 (as shown in FIG. 12). In some cases, the non-transitory computer-readable medium may be separate from computer system 1200. In one example, the non-transitory computer-readable medium may be a removable medium provided to input device(s) 1206 (as shown in FIG. 12), such as those described in reference to input device(s) 1206, with instructions 1216 being read into computer system 1200 by input device(s) 1206. In another example, the non-transitory computer-readable medium may be a component of a remote electronic device, such as a mobile phone, that may wirelessly transmit a data signal that carries instructions 1216 to computer system 1200 and that is received by communications subsystem 1210 (as shown in FIG. 12).

Instructions 1216 may take any suitable form to be read and/or executed by computer system 1200. For example, instructions 1216 may be source code (written in a human-readable programming language such as Java, C, C++, C#, Python), object code, assembly language, machine code, microcode, executable code, and/or the like. In one example, instructions 1216 are provided to computer system 1200 in the form of source code, and a compiler is used to translate instructions 1216 from source code to machine code, which may then be read into main memory 1214 for execution by processor(s) 1204. As another example, instructions 1216 are provided to computer system 1200 in the form of an executable file with machine code that may immediately be read into main memory 1214 for execution by processor(s) 1204. In various examples, instructions 1216 may be provided to computer system 1200 in encrypted or unencrypted form, compressed or uncompressed form, as an installation package or an initialization for a broader software deployment, among other possibilities.

In one aspect of the present disclosure, a system (e.g., computer system 1200) is provided to perform methods in accordance with various embodiments of the present disclosure. For example, some embodiments may include a system comprising one or more processors (e.g., processor(s) 1204) that are communicatively coupled to a non-transitory computer-readable medium (e.g., memory device(s) 1212 or main memory 1214). The non-transitory computer-readable medium may have instructions (e.g., instructions 1216) stored therein that, when executed by the one or more processors, cause the one or more processors to perform the methods described in the various embodiments.

In another aspect of the present disclosure, a computer-program product that includes instructions (e.g., instructions 1216) is provided to perform methods in accordance with various embodiments of the present disclosure. The computer-program product may be tangibly embodied in a non-transitory computer-readable medium (e.g., memory device(s) 1212 or main memory 1214). The instructions may be configured to cause one or more processors (e.g., processor(s) 1204) to perform the methods described in the various embodiments.

In another aspect of the present disclosure, a non-transitory computer-readable medium (e.g., memory device(s) 1212 or main memory 1214) is provided. The non-transitory computer-readable medium may have instructions (e.g., instructions 1216) stored therein that, when executed by one or more processors (e.g., processor(s) 1204), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of performing forward error correction in a communication system, the method comprising:
   receiving a set of data blocks to be transmitted over a wireless channel;
   forming rows of a flexible matrix using the set of data blocks based on arrival times of the set of data blocks, each of the rows corresponding to a different time window;
   computing a set of random parity blocks by performing row-wise parity operations on the flexible matrix;
   computing a set of burst parity blocks by performing column-wise parity operations on the flexible matrix in accordance with a burst parity computation scheme; and
   transmitting the set of data blocks, the set of random parity blocks, and the set of burst parity blocks over the wireless channel to a receiver.

2. The method of claim 1, further comprising:
   adding the set of random parity blocks to the flexible matrix; and
   adding the set of burst parity blocks to a last row of the flexible matrix.

3. The method of claim 1, wherein the wireless channel is a satellite communication channel.

4. The method of claim 1, wherein each of the set of random parity blocks is computed based on a random parity group comprising a subset of the set of data blocks from one or more of the rows of the flexible matrix, wherein the random parity group for each of the set of random parity blocks comprises N of the data blocks.

5. The method of claim 1, further comprising:
   selecting the burst parity computation scheme from a set of burst parity computation schemes including a first burst parity computation scheme and a second burst parity computation scheme, wherein the set of burst parity blocks are computed in accordance with the burst parity computation scheme, wherein, in the first burst parity computation scheme, the set of burst parity blocks are computed by performing column-wise parity operations independent of the set of random parity blocks, and wherein, in the second burst parity computation scheme, the set of burst parity blocks are computed by performing column-wise parity operations based on the set of random parity blocks.

6. The method of claim 5, wherein the burst parity computation scheme is selected based on a characterization of random and burst losses experienced by the communication system.

7. The method of claim 1, wherein the set of data blocks include user data received over a terrestrial network.

8. A non-transitory computer-readable medium comprising instructions that, when executed by one or more processors, cause the one or more processors to perform operations for performing forward error correction in a communication system, the operations comprising:
receiving a set of data blocks to be transmitted over a wireless channel;
forming rows of a flexible matrix using the set of data blocks based on arrival times of the set of data blocks, each of the rows corresponding to a different time window;
computing a set of random parity blocks by performing row-wise parity operations on the flexible matrix;
computing a set of burst parity blocks by performing column-wise parity operations on the flexible matrix in accordance with a burst parity computation scheme; and
transmitting the set of data blocks, the set of random parity blocks, and the set of burst parity blocks over the wireless channel to a receiver.

9. The non-transitory computer-readable medium of claim 8, wherein the operations further comprise:
adding the set of random parity blocks to the flexible matrix; and
adding the set of burst parity blocks to a last row of the flexible matrix.

10. The non-transitory computer-readable medium of claim 8, wherein the wireless channel is a satellite communication channel.

11. The non-transitory computer-readable medium of claim 8, wherein each of the set of random parity blocks is computed based on a random parity group comprising a subset of the set of data blocks from one or more of the rows of the flexible matrix, wherein the random parity group for each of the set of random parity blocks comprises N of the data blocks.

12. The non-transitory computer-readable medium of claim 8, wherein the operations further comprise:
selecting the burst parity computation scheme from a set of burst parity computation schemes including a first burst parity computation scheme and a second burst parity computation scheme, wherein the set of burst parity blocks are computed in accordance with the burst parity computation scheme, wherein, in the first burst parity computation scheme, the set of burst parity blocks are computed by performing column-wise parity operations independent of the set of random parity blocks, and wherein, in the second burst parity computation scheme, the set of burst parity blocks are computed by performing column-wise parity operations based on the set of random parity blocks.

13. The non-transitory computer-readable medium of claim 12, wherein the burst parity computation scheme is selected based on a characterization of random and burst losses experienced by the communication system.

14. The non-transitory computer-readable medium of claim 8, wherein the set of data blocks include user data received over a terrestrial network.

15. A system comprising:
one or more processors; and
a computer-readable medium comprising instructions that, when executed by the one or more processors, cause the one or more processors to perform operations for performing forward error correction in a communication system, the operations comprising:
receiving a set of data blocks to be transmitted over a wireless channel;
forming rows of a flexible matrix using the set of data blocks based on arrival times of the set of data blocks, each of the rows corresponding to a different time window;
computing a set of random parity blocks by performing row-wise parity operations on the flexible matrix;
computing a set of burst parity blocks by performing column-wise parity operations on the flexible matrix in accordance with a burst parity computation scheme; and
transmitting the set of data blocks, the set of random parity blocks, and the set of burst parity blocks over the wireless channel to a receiver.

16. The system of claim 15, wherein the operations further comprise:
adding the set of random parity blocks to the flexible matrix; and
adding the set of burst parity blocks to a last row of the flexible matrix.

17. The system of claim 15, wherein the wireless channel is a satellite communication channel.

18. The system of claim 15, wherein each of the set of random parity blocks is computed based on a random parity group comprising a subset of the set of data blocks from one or more of the rows of the flexible matrix, wherein the random parity group for each of the set of random parity blocks comprises N of the data blocks.

19. The system of claim 15, wherein the operations further comprise:
selecting the burst parity computation scheme from a set of burst parity computation schemes including a first burst parity computation scheme and a second burst parity computation scheme, wherein the set of burst parity blocks are computed in accordance with the burst parity computation scheme, wherein, in the first burst parity computation scheme, the set of burst parity blocks are computed by performing column-wise parity operations independent of the set of random parity blocks, and wherein, in the second burst parity computation scheme, the set of burst parity blocks are computed by performing column-wise parity operations based on the set of random parity blocks.

20. The system of claim 19, wherein the burst parity computation scheme is selected based on a characterization of random and burst losses experienced by the communication system.

* * * * *